(12) United States Patent
Chelnokov et al.

(10) Patent No.: US 12,136,208 B2
(45) Date of Patent: Nov. 5, 2024

(54) AUTOMATIC CLEAN UP OF JAW SCANS

(71) Applicant: James R. Glidewell Dental Ceramics, Inc., Newport Beach, CA (US)

(72) Inventors: Fedor Chelnokov, Khimki (RU); Grant Karapetyan, Moscow (RU); Stanislav Shushkevich, Moscow Region (RU)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 176 days.

(21) Appl. No.: 17/219,161

(22) Filed: Mar. 31, 2021

(65) Prior Publication Data

US 2022/0318989 A1    Oct. 6, 2022

(51) Int. Cl.
| | |
|---|---|
| *G06T 17/20* | (2006.01) |
| *G06T 5/00* | (2024.01) |
| *G06T 5/70* | (2024.01) |
| *G06T 7/00* | (2017.01) |
| *G06T 7/11* | (2017.01) |
| *G06T 7/60* | (2017.01) |
| *G06T 15/20* | (2011.01) |

(52) U.S. Cl.
CPC .............. *G06T 7/0012* (2013.01); *G06T 5/00* (2013.01); *G06T 5/70* (2024.01); *G06T 7/11* (2017.01); *G06T 7/60* (2013.01); *G06T 15/205* (2013.01); *G06T 17/20* (2013.01); *G06T 2207/20084* (2013.01); *G06T 2207/20221* (2013.01); *G06T 2207/30036* (2013.01)

(58) Field of Classification Search
CPC ......... G06T 7/0012; G06T 7/11; G06T 17/20; G06T 2207/30036; G06T 2210/41; G06T 2219/2021; G06T 19/20; G06T 5/00; G06T 5/70; G06T 7/60; G06T 15/205; G06T 2207/20084; G06T 2207/20221; G06T 5/002; G06T 5/20
See application file for complete search history.

(56) References Cited

U.S. PATENT DOCUMENTS

| | | |
|---|---|---|
| 6,140,950 A | 10/2000 | Oprescu |
| 6,409,504 B1 | 6/2002 | Jones et al. |
| 6,701,016 B1 | 3/2004 | Jojic et al. |
| 7,084,868 B2 | 8/2006 | Farag et al. |

(Continued)

FOREIGN PATENT DOCUMENTS

| | | |
|---|---|---|
| CA | 3146240 A1 | 1/2021 |
| DE | 102017203475 A1 | 9/2018 |

(Continued)

OTHER PUBLICATIONS

US 11,182,981 B2, 11/2021, Long et al. (withdrawn)

(Continued)

*Primary Examiner* — Jon Chang
(74) *Attorney, Agent, or Firm* — Klarquist Sparkman, LLP

(57) ABSTRACT

A computer-implemented method and system performs segmentation on at least a portion of the digital jaw to provide one or more digital surface segments, determines a digital tooth center for at least one digital tooth in the digital jaw, determines a digital tooth area around the digital tooth center, deletes one or more surface segments not intersecting with the digital tooth area; and smooths a mesh boundary.

20 Claims, 27 Drawing Sheets

(56) References Cited

U.S. PATENT DOCUMENTS

| | | |
|---|---|---|
| 7,187,790 B2 | 3/2007 | Sabol et al. |
| 7,490,085 B2 | 2/2009 | Walker et al. |
| 7,702,492 B2 | 4/2010 | Marshall |
| 7,708,557 B2 | 5/2010 | Rubbert |
| 7,860,300 B2 | 12/2010 | Siltanen et al. |
| 8,068,580 B2 | 11/2011 | Lang et al. |
| 8,126,726 B2 | 2/2012 | Matov et al. |
| 8,454,362 B2 | 6/2013 | Rubbert |
| 8,602,780 B2 | 12/2013 | Rubbert |
| 9,417,700 B2 | 8/2016 | El Dokor et al. |
| 9,474,582 B2 | 10/2016 | Musuvathy et al. |
| 9,818,186 B2 | 11/2017 | Kim et al. |
| 9,865,176 B2 | 1/2018 | Tran |
| 10,278,584 B2 | 5/2019 | Glinec et al. |
| 10,438,363 B2 | 10/2019 | Kim et al. |
| 10,537,463 B2 | 1/2020 | Kopelman |
| 10,542,944 B2 | 1/2020 | Petersilka |
| 10,548,690 B2 | 2/2020 | Wen |
| 10,755,409 B2 | 8/2020 | Salah et al. |
| 10,912,530 B2 | 2/2021 | Mandelkern et al. |
| 10,925,691 B2 | 2/2021 | Yancey et al. |
| 10,932,890 B1 | 3/2021 | Sant et al. |
| 10,984,529 B2 | 4/2021 | Carter et al. |
| 10,997,727 B2 | 5/2021 | Xue et al. |
| 11,000,349 B2 | 5/2021 | Willers et al. |
| 11,007,040 B2 | 5/2021 | Azernikov et al. |
| 11,026,766 B2 | 6/2021 | Chekh et al. |
| 11,049,248 B2 | 6/2021 | Salah et al. |
| 11,051,912 B2 | 7/2021 | Martz et al. |
| 11,051,914 B2 | 7/2021 | Kopelman et al. |
| 11,109,945 B2 | 8/2021 | Salah et al. |
| 11,116,466 B2 | 9/2021 | Mandelkern et al. |
| 11,154,267 B2 | 10/2021 | Mandelkern et al. |
| 11,164,045 B2 | 11/2021 | Paik et al. |
| 11,189,021 B2 | 11/2021 | Shah et al. |
| 11,191,508 B2 | 12/2021 | Mandelkern et al. |
| 11,194,312 B2 | 12/2021 | Cramer et al. |
| 11,232,573 B2 | 1/2022 | Brown et al. |
| 11,238,586 B2 | 2/2022 | Minchenkov et al. |
| 11,250,580 B2 | 2/2022 | Meyer et al. |
| 11,270,523 B2 | 3/2022 | Long et al. |
| 11,278,375 B2 | 3/2022 | Wang et al. |
| 11,291,404 B2 | 4/2022 | Schnabel et al. |
| 11,291,532 B2 | 4/2022 | Azernikov et al. |
| 11,399,792 B2 | 8/2022 | Mandelkern et al. |
| 11,403,813 B2 | 8/2022 | Katzman et al. |
| 11,423,697 B1 | 8/2022 | Wucher et al. |
| 11,517,272 B2 | 12/2022 | Unklesbay et al. |
| 11,534,272 B2 | 12/2022 | Li et al. |
| 11,534,275 B2 | 12/2022 | Wey |
| 11,568,656 B2 | 1/2023 | Mohan et al. |
| 11,589,955 B2 | 2/2023 | Medvinskaya et al. |
| 11,589,957 B2 | 2/2023 | Carrier, Jr. et al. |
| 11,622,843 B2 | 4/2023 | Nikolskiy et al. |
| 11,672,629 B2 | 6/2023 | Chekh et al. |
| 11,676,701 B2 | 6/2023 | Carter et al. |
| 11,694,418 B2 | 7/2023 | Long et al. |
| 11,735,306 B2 | 8/2023 | Wirjadi et al. |
| 11,887,209 B2 | 1/2024 | Traff et al. |
| 11,894,114 B2 | 2/2024 | Paik et al. |
| 11,900,538 B2 | 2/2024 | Katzman et al. |
| 11,918,437 B2 | 3/2024 | Salah et al. |
| 2002/0015934 A1 | 2/2002 | Rubbert et al. |
| 2002/0028418 A1 | 3/2002 | Farag et al. |
| 2004/0122702 A1 | 6/2004 | Sabol et al. |
| 2004/0122703 A1 | 6/2004 | Walker et al. |
| 2004/0122719 A1 | 6/2004 | Sabol et al. |
| 2005/0192835 A1 | 9/2005 | Kuo et al. |
| 2007/0047794 A1 | 3/2007 | Lang et al. |
| 2007/0183633 A1 | 8/2007 | Hoffmann |
| 2009/0019552 A1 | 1/2009 | McLaughlin et al. |
| 2009/0024416 A1 | 1/2009 | McLaughlin et al. |
| 2010/0309301 A1 | 12/2010 | Thiel et al. |
| 2013/0022252 A1 | 1/2013 | Chen et al. |
| 2013/0022255 A1 | 1/2013 | Chen et al. |
| 2013/0244208 A1 | 9/2013 | Rubbert |
| 2014/0003695 A1 | 1/2014 | Dean et al. |
| 2015/0056576 A1 | 2/2015 | Nikolskiy et al. |
| 2016/0199215 A1 | 7/2016 | Kopelman |
| 2017/0008168 A1 | 1/2017 | Weng et al. |
| 2017/0045950 A1 | 2/2017 | El Dokor et al. |
| 2017/0100213 A1 | 4/2017 | Kuo |
| 2017/0281110 A1 | 10/2017 | Mandelkern et al. |
| 2017/0340418 A1 | 11/2017 | Raanan |
| 2018/0008213 A1 | 1/2018 | Rubbert |
| 2018/0028294 A1 | 2/2018 | Azernikov et al. |
| 2018/0121601 A1 | 5/2018 | Hahm et al. |
| 2018/0132982 A1 | 5/2018 | Nikolskiy et al. |
| 2018/0144466 A1 | 5/2018 | Hsieh et al. |
| 2018/0303581 A1 | 10/2018 | Martz et al. |
| 2018/0360567 A1 | 12/2018 | Xue et al. |
| 2018/0365089 A1 | 12/2018 | Okanohara et al. |
| 2019/0083209 A1 | 3/2019 | Lior et al. |
| 2019/0150724 A1 | 5/2019 | Elazar et al. |
| 2019/0197358 A1 | 6/2019 | Madani et al. |
| 2019/0282344 A1 | 9/2019 | Azernikov et al. |
| 2019/0318479 A1 | 10/2019 | Ajri et al. |
| 2020/0000562 A1 | 1/2020 | Wey |
| 2020/0013145 A1 | 1/2020 | Ratner et al. |
| 2020/0022783 A1 | 1/2020 | Cramer et al. |
| 2020/0022790 A1 | 1/2020 | Fisker |
| 2020/0027252 A1 | 1/2020 | Ye et al. |
| 2020/0066391 A1 | 2/2020 | Sachdeva et al. |
| 2020/0125069 A1 | 4/2020 | Sirovskiy et al. |
| 2020/0175681 A1 | 6/2020 | Ezhov et al. |
| 2020/0268495 A1 | 8/2020 | Ryakhovsky et al. |
| 2020/0273248 A1 | 8/2020 | Jorgensen et al. |
| 2020/0293878 A1 | 9/2020 | Bhaskar et al. |
| 2020/0297458 A1 | 9/2020 | Roschin et al. |
| 2020/0311934 A1 | 10/2020 | Cherkas et al. |
| 2020/0383752 A1 | 12/2020 | Willers et al. |
| 2020/0402272 A1 | 12/2020 | Xu et al. |
| 2020/0405456 A1 | 12/2020 | Nikolskiy et al. |
| 2020/0405464 A1 | 12/2020 | Nikolskiy et al. |
| 2020/0411201 A1 | 12/2020 | Kearney et al. |
| 2021/0005017 A1 | 1/2021 | Hollenbeck |
| 2021/0012884 A1 | 1/2021 | Kim et al. |
| 2021/0034813 A1 | 2/2021 | Wu et al. |
| 2021/0059796 A1 | 3/2021 | Weiss et al. |
| 2021/0073998 A1 | 3/2021 | Brown et al. |
| 2021/0082184 A1* | 3/2021 | Claessen ................ G06T 17/00 |
| 2021/0085238 A1 | 3/2021 | Schnabel et al. |
| 2021/0090272 A1 | 3/2021 | Meyer et al. |
| 2021/0093421 A1 | 4/2021 | Michaeli et al. |
| 2021/0100642 A1 | 4/2021 | Weiss et al. |
| 2021/0100643 A1 | 4/2021 | Weiss et al. |
| 2021/0106409 A1 | 4/2021 | Ojelund et al. |
| 2021/0110605 A1 | 4/2021 | Haslam et al. |
| 2021/0153986 A1 | 5/2021 | Wirjadi et al. |
| 2021/0158607 A1 | 5/2021 | Katzman et al. |
| 2021/0174604 A1 | 6/2021 | Long et al. |
| 2021/0196434 A1 | 7/2021 | Cramer et al. |
| 2021/0216822 A1 | 7/2021 | Paik et al. |
| 2021/0236249 A1 | 8/2021 | Nikolskiy et al. |
| 2021/0251729 A1 | 8/2021 | Schneider et al. |
| 2021/0255600 A1 | 8/2021 | Faust |
| 2021/0264611 A1 | 8/2021 | Xue et al. |
| 2021/0315667 A1 | 10/2021 | Raslambekov |
| 2021/0321872 A1 | 10/2021 | Saphier et al. |
| 2021/0338400 A1 | 11/2021 | Murata et al. |
| 2021/0353154 A1 | 11/2021 | Saphier et al. |
| 2021/0393375 A1 | 12/2021 | Chekh et al. |
| 2022/0000583 A1 | 1/2022 | Parpara et al. |
| 2022/0008175 A1 | 1/2022 | Ojelund et al. |
| 2022/0028162 A1 | 1/2022 | Katzman et al. |
| 2022/0130045 A1 | 4/2022 | Kopelman et al. |
| 2022/0137592 A1 | 5/2022 | Cramer et al. |
| 2022/0148173 A1 | 5/2022 | Minchenkov et al. |
| 2022/0165388 A1 | 5/2022 | Chernov et al. |
| 2022/0189130 A1 | 6/2022 | Long et al. |
| 2022/0215531 A1 | 7/2022 | Azernikov et al. |
| 2022/0215928 A1 | 7/2022 | Tabak et al. |
| 2022/0257342 A1 | 8/2022 | Kuo |
| 2022/0262007 A1 | 8/2022 | Cramer et al. |

(56) References Cited

U.S. PATENT DOCUMENTS

| | | |
|---|---|---|
| 2022/0296344 A1 | 9/2022 | Lee et al. |
| 2022/0304782 A1 | 9/2022 | Derzapf et al. |
| 2022/0327774 A1 | 10/2022 | Katzman et al. |
| 2022/0350936 A1 | 11/2022 | Azernikov et al. |
| 2022/0369916 A1 | 11/2022 | Carrier, Jr. et al. |
| 2022/0378548 A1 | 12/2022 | Salah et al. |
| 2023/0048895 A1 | 2/2023 | Wucher et al. |
| 2023/0057664 A1 | 2/2023 | Steger |
| 2023/0066220 A1 | 3/2023 | Coulombe et al. |
| 2023/0075514 A1 | 3/2023 | Wiedemann et al. |
| 2023/0153476 A1 | 5/2023 | Fabbri et al. |
| 2023/0410495 A1 | 12/2023 | Xue et al. |
| 2024/0028782 A1 | 1/2024 | Selberis et al. |
| 2024/0029380 A1 | 1/2024 | Azernikov et al. |

FOREIGN PATENT DOCUMENTS

| | | |
|---|---|---|
| EP | 1368986 B1 | 12/2011 |
| EP | 3671531 A1 | 12/2018 |
| EP | 3767521 A1 | 7/2019 |
| EP | 3797732 A1 | 9/2019 |
| KR | 101718868 B1 | 3/2017 |
| KR | 102334519 B1 | 12/2021 |
| WO | 2012061652 A2 | 5/2012 |
| WO | 2016044465 A1 | 3/2016 |
| WO | 2018069736 A1 | 4/2018 |
| WO | 2018118200 A1 | 6/2018 |
| WO | 2018158411 A1 | 9/2018 |
| WO | 2018195554 A1 | 10/2018 |
| WO | 2019217764 A1 | 4/2019 |
| WO | 2019204520 A1 | 10/2019 |
| WO | 2019209820 A1 | 10/2019 |
| WO | 2020048960 A1 | 3/2020 |
| WO | 2020173912 A1 | 3/2020 |
| WO | 2020089406 A1 | 5/2020 |
| WO | 2020161245 A1 | 8/2020 |
| WO | 2020182920 A1 | 9/2020 |
| WO | 2021046147 A1 | 3/2021 |
| WO | 2021046434 A1 | 3/2021 |
| WO | 2021058643 A1 | 4/2021 |
| WO | 2021110938 A1 | 6/2021 |
| WO | 2021113501 A1 | 6/2021 |
| WO | 2021155230 A1 | 8/2021 |
| WO | 2021210723 A1 | 10/2021 |
| WO | 2021210966 A1 | 10/2021 |
| WO | 2021214212 A1 | 10/2021 |
| WO | 2022131418 A1 | 6/2022 |
| WO | 2022131419 A1 | 6/2022 |

OTHER PUBLICATIONS

Xu et al. "3D Tooth Segmentation and Labeling Using Deep Convolutional Neural Networks." IEEE Transactions on Visualization and Computer Graphics, vol. 25, No. 7, Jul. 2019, pp. 2336-2348 (Year: 2019).*

Mairaj et al. "Teeth Segmentation and Feature Extraction for Odontological Biometrics." Sixth International Conference on Intelligent Information Hiding and Multimedia Signal Processing, Oct. 15, 2010, pp. 323-328 (Year: 2010).*

Liu, Rong. "Spectral Mesh Segmentation", Thesis, Simon Frasier University, 2009. 149 pages (Year: 2009).*

International Application No. PCT/US22/22587, International Search Report and Written Opinion, mailed on Jun. 22, 2022, in 14 pages.

Raydent Cad, AI Based Dental CAD Solution brochure, in 7 pages. (date unavailable).

PCT/US2022/022587, Transmittal of Copy of International Preliminary Report, mailed on Oct. 12, 2023 7 pages.

Mark Pauly, Mesh Smoothing, Ecole Polytechnique Federale de Lausanne, in 43 pages.(date unavailable).

Hu et al., Enhancing Dental CBCT Image by Semi-coupled Generative Adversarial Networks, Journal of Dental Research, DOI:10.1177/ToBeAssigned, in 8 pages, (2016).

Groueix, et al. A Papier-Mache Approach to Learning 3D Surface Generation, Computer Vision Foundation, pp. 216-224, (2018).

Qi et al, PointNet: Deep Learning on Point Sets for 3D Classifications and Segmentation, Computer Vision Foundation, pp. 652-660, (2017).

Qi et al, PointNet++: Deep Hierarchical Feature Learning on Point Sets in a Metric Space, Computer Vision Foundation, in 14 pages, (2017).

H. Wang et al., Multiclass CBCT Image Segmentation for Orthodontics with Deep Learning, Journal of Dental Research, 2021, vol. 100(9), 943-949, International & American Associates for dental Research 2021.

Yin et al., Algorithm of drawing isoline based on improved Delaunay triangle net, Hubei Province Key Laboratory of Intelligent Information Processing and Real-time Industrial System, Wuhan University of Science and technology, 978-1-5090-6161-7/17/#31.00, 2017, IEEE, pp. 1022-1026.

Cowley et al., The Effect of Gingival-Margin Design on the Retention of Thermoformed Aligners, Nov. 2012 JCO, Inc. vol. XLVI, No. 11, pp. 697-702.

Hanchao Li et al., Pyramid Attention Network for Semantic Segmentation, Nov. 25, 2018, in 13 pages.

Jeremy Zhang, UNet—Line by Line Explanation, Published in Towards Data Science Oct. 17, 2019, in 20 pages.

Joseph Redmon et al., You Only Look Once: Unified, Real-Time Object Detection, University of Washington, Allen Institute for AI, May 9, 2016, in 10 pages, http://pjreddie.com/yolo/.

Joseph Redmon et al., YOLO9000: Better, Faster, Stronger, University of Washington, Dec. 25, 2016, in 9 pages, http://pjreddie.com/yolo9000/.

Joseph Redmon et al., YOLOv3: An Incremental Improvement, University of Washington, Apr. 8, 2018, in 6 pages.

Olaf Ronneberger et al., U-Net: Convolutional Networks for Biomedical Image Segmentation, Computer Science Department and BIOSS Centre for Biological Signalling Studies, University of Freiburg, Germany. May 18, 2015 8 pages.

Pablo Ruiz, ResNets, Harvard University, Aug. 2018, in 8 pages.

Yu-Bing Chang et al., An Automatic and Robust Algorithm of Reestablishment of Digital dental Occlusion, HHS Public Access, IEEE Trans Med Imaging. Sep. 2010; 29(9) 1652-1663,doi: 10.1109/TMI.2010.2049526, in 36 pages.

YOLO Real Time Objection Detection, downloaded from https://pjreddie.com/darknet/yolo/ on Jun. 10, 2020, in 10 pages.

Shunping Ji, 3D Convolutional Neural Networks for Crop Classification with Multi-Temporal Remote Sensing Images, Remote Sensing, 2018, 10, 75; doi: 10.3390/rs10010075, www.MDPI.com/journal/remotesensing, pp. 1-17.

Imagoworks web page, https://imagoworks.ai/#technology, copyright 2021 downloaded on Feb. 18, 2022, pp. 1-8.

International application No. PCT/US21/15820, Notification of Transmittal of the International Search Report and the Written Opinion of the International Searching Authority or the Declaration, date of mailing Jun. 9, 2021, in 17 pages.

Youngjun Kevin Kim, Imagoworks B2B Collaboration Proposal, Sep. 2021, in 32 pages.

Chen et al., A Convolutional Neural Networks for Teeth Margin Detection on 3-Dimensional Dental Meshes, Mesh CNN for Teeth Margin Detection, in 11 pages, Jul. 7, 2021.

Detect Edit Margins—Exocad Wiki, Release from 2022, downloaded Sep. 1, 2023, 5 pages.

International Application No. PCT/US2017/043943, International Search Report and Written Opinion, mailed Oct. 12, 2017, in 11 pages.

International Application No. PCT/US2023/070692, International Search Report and Written Opinion, mailed Dec. 13, 2023, in 16 pages.

Hang-Nga Mai et al., Reliability of automatic finish line detection for tooth preparation in dental computer-aided software, J.Prosthodont Res. 2023:67(1): 138-143.

(56) References Cited

OTHER PUBLICATIONS

Raydent CAD, AI Based Dental CAD Solution brochure, in 7 pages.

Stefan Raith et al., Artificial Neural Networks as a Powerful Numerical Tool to Classify Specific Features of a Tooth Based on 3D Scan Data, Elsevier, Computers in Biology and Medicine 80 (2017) 65-76, in 12 pages.

International Application No. PCT/US2022/022587, International Search Report and Written Opinion, mailed Jun. 22, 2022, in 14 pages.

PCT/US2022/022587, Transmittal of International Preliminary Report, mailed on Oct. 12, 2023, 7 pages.

Jifeng Dai et al., R-FCN: Object Detection via Region-based Fully Convolutional Networks, 30th Conference on Neural Information Processing Systems (NIPS 2016), Barcelona Spain, in 9 pages.

Toshiaki Kondo et al., Tooth Segmentation of Dental Study Models Using Range Images, Research Gate, IEEE Transactions on Medical Imaging, Apr. 2004, vol. 23, No. 3, Mar. 2004, in 14 pages.

Ross Girshick, Fast R-CNN, in 9 pages, (Dec. 2015).

Shuai Yang et al., 3D Intelligent Scissors for Dental Mesh Segmentation, Hindawi, Computational and Mathematical Methods in Medicine, vol. 2020, Article ID 1394231, 12 pages.

Shuai Yang et al., Interactive Tooth Segmentation Method of Dental Model based on Geodesic, Research Gate, Conference paper Jan. 2017, Advances in Engineering Research, vol. 138, in 6 pages.

Tsung-Yi Lin et al., Feature Pyramid Networks for Object Detection, arXiv: 1612.03144v2 [cs.CV] Apr. 19, 2017, in 10 pages.

Tsung-Yi Lin et al., Focal Loss for Dense Object Detection, arXiv: 1708.02002v2 [cs.CV] Feb. 7, 2018, in 10 pages.

Andrew Nealen et al., Laplacian Mesh Optimization, in 9 pages,(Nov. 2006).

Mark Pauly, Mesh Smoothing, Ecole Polytechnique Federale de Lausanne, in 43 pages.

\* cited by examiner

AUTOMATIC CLEAN UP OF JAW SCANS

BACKGROUND

Specialized dental laboratories typically use computer-aided design (CAD) and computer-aided manufacturing (CAM) milling systems to manufacture dental prostheses based on patient-specific instructions provided by dentists. In a typical work flow, the dental laboratories receive information about a patient's oral situation from a dentist. Using this information, the dental laboratory designs a dental prosthesis on the CAD system and manufactures the prosthesis on the CAM system with a mill or other fabrication system. To use the CAD/CAM system, a digital model of the patient's dentition is required as an input to the process.

Although digitizing a physical dental impression can provide a digital dental model for a CAD/CAM system, digital dental impressions can contain extraneous data such as remnants of an impression tray or other regions not useful for dental processing which can interfere with viewing useful information.

SUMMARY

A computer-implemented method of processing a digital jaw scan includes: receiving a digital model comprising a digital jaw; performing segmentation on at least a portion of the digital jaw to provide one or more digital surface segments; determining a digital tooth center for at least one digital tooth in the digital jaw; determining a digital tooth area around the digital tooth center; deleting one or more surface segments not intersecting with the digital tooth area; and smoothing a mesh boundary.

A system of processing a digital jaw scan includes: a processor; and a computer-readable storage medium comprising instructions executable by the processor to perform steps including: receiving a digital model comprising a digital jaw; performing segmentation on at least a portion of the digital jaw to provide one or more digital surface segments; determining a digital tooth center for at least one digital tooth in the digital jaw; determining a digital tooth area around the digital tooth center; deleting one or more surface segments not intersecting with the digital tooth area; and smoothing a mesh boundary.

A non-transitory computer readable medium storing executable computer program instructions for processing a digital jaw scan, the computer program instructions including instructions for: receiving a digital model comprising a digital jaw; performing segmentation on at least a portion of the digital jaw to provide one or more digital surface segments; determining a digital tooth center for at least one digital tooth in the digital jaw; determining a digital tooth area around the digital tooth center; deleting one or more surface segments not intersecting with the digital tooth area; and smoothing a mesh boundary.

DETAILED DESCRIPTION

Figure 1:
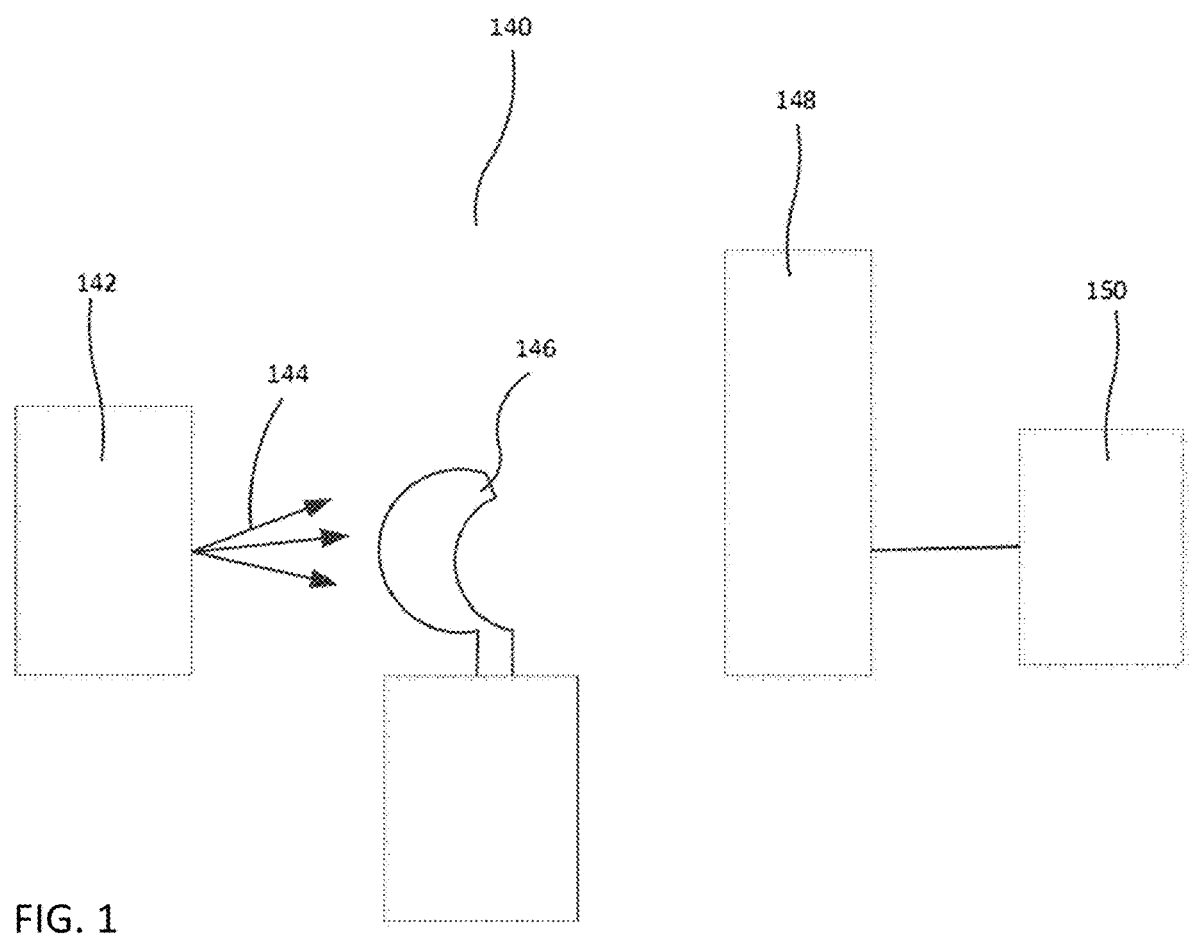
FIG. 1 shows a perspective view of a three-way dental impression tray.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Some embodiments can include a computer-implemented method of processing a digital jaw model. Some embodiments can include receiving a digital model that can include a digital jaw, for example.

In some embodiments, the digital jaw model can be generated by scanning a physical impression using any scanning technique known in the art including, but not limited to, for example, optical scanning, CT scanning, etc. or by intraoral scanning of the patient's mouth (dentition). A conventional scanner typically captures the shape of the physical impression/patient's dentition in 3 dimensions during a scan and digitizes the shape into a 3 dimensional digital model. The digital jaw model can each include multiple interconnected polygons in a topology that corresponds to the shape of the physical impression/patient's dentition, for example. In some embodiments, the polygons can include two or more digital triangles. In some embodiments, the scanning process can produce STL, PLY, or CTM files, for example that can be suitable for use with a dental design software, such as FastDesign™ dental design software provided by Glidewell Laboratories of Newport Beach, Calif. One example of CT scanning is described in U.S. Patent Application No. US20180132982A1 to Nikolskiy et al., which is hereby incorporated in its entirety by reference.

A computed tomography (CT) scanner uses x-rays to make a detailed image of an object. A plurality of such images are then combined to form a 3D model of the object. A schematic diagram of an example of a CT scanning system 140 is shown in FIG. 1. The CT scanning system 140 includes a source of x-ray radiation 142 that emits an x-ray beam 144. An object 146 being scanned is placed between the source 142 and an x-ray detector 148. In some embodiments, the object can be any object that can, for example, fit in a CT scanning system and be penetrated by x-rays. The x-ray detector 148, in turn, is connected to a processor 150 that is configured to receive the information from the detector 148 and to convert the information into a digital image file. Those skilled in the art will recognize that the processor 150 may comprise one or more computers that may be directly connected to the detector, wirelessly connected, connected via a network, or otherwise in direct or indirect communication with the detector 148.

An example of a suitable scanning system 140 includes a Nikon Model XTH 255 CT Scanner (Metrology) which is commercially available from Nikon Corporation. The example scanning system includes a 225 kV microfocus x-ray source with a 3 µm focal spot size to provide high performance image acquisition and volume processing. The processor 150 may include a storage medium that is configured with instructions to manage the data collected by the scanning system. A particular scanning system is described for illustrative purposes; any type/brand of CT scanning system can be utilized.

Figure 2:
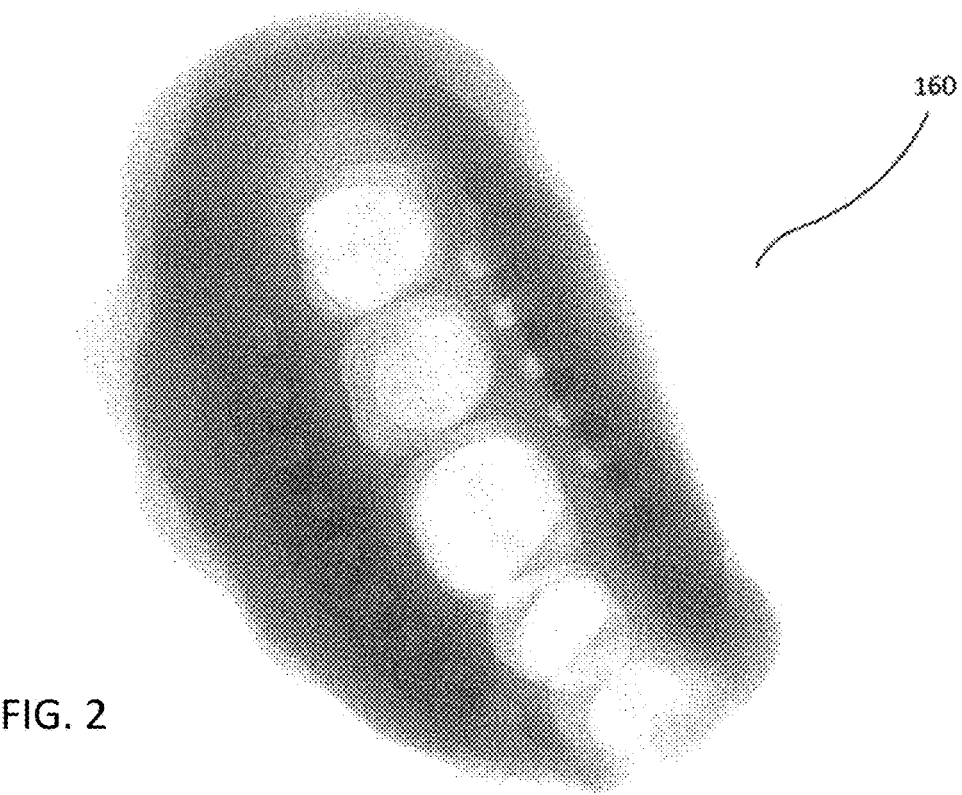
FIG. 2 shows a cross-sectional view of a three-way dental impression tray containing impression material.

During operation of the scanning system 140, the object 146 is located between the x-ray source 142 and the x-ray detector 148. A series of images of the object 146 are collected by the processor 150 as the object 146 is rotated in place between the source 142 and the detector 146. An example of a single radiograph 160 is shown in FIG. 2. The radiograph 160 and all radiographs described herein are understood to be digital. In one embodiment, a series of 720 images can be collected as the object 146 is rotated in place between the source 142 and the detector 148. In other embodiments, more images or fewer images may be collected as will be understood by those skilled in the art. In some embodiments, radiographs can be referred to as projection images.

Figure 3:
FIG. 3 shows a schematic diagram of a computed tomography (CT) scanning system.

The plurality of radiographs 160 of the object 146 are generated by and stored within a storage medium contained within the processor 150 of the scanning system 140, where they may be used by software contained within the processor to perform additional operations. For example, in an embodiment, the plurality of radiographs 160 can undergo tomographic reconstruction in order to generate a 3D virtual image 170 (see FIG. 3) from the plurality of 2D radiographs 160 generated by the scanning system 140. In the embodiment shown in FIG. 3, the 3D virtual image 170 is in the form of a volumetric image or volumetric density file (shown in cross-section in FIG. 3) that is generated from the plurality of radiographs 160 by way of a CT reconstruction algorithm associated with the scanning system 140. One type of CT reconstruction algorithm can be the filtered backprojection algorithm as described in the *Principles of Computerized Tomographic Imaging* (A. C. Kak and Malcolm Slaney, *Principles of Computerized Tomographic Imaging*, IEEE Press, 1988) publication. Other types of CT reconstruction algorithms known in the art can also be used.

In some embodiments, the digital jaw model can also be generated by intraoral scanning of the patient's dentition, for example. In some embodiments, each electronic image is obtained by a direct intraoral scan of the patient's teeth. This will typically take place, for example, in a dental office or clinic and be performed by a dentist or dental technician. In other embodiments, each electronic image is obtained indirectly by scanning an impression of the patient's teeth, by scanning a physical model of the patient's teeth, or by other methods known to those skilled in the art. This will typically take place, for example, in a dental laboratory and be performed by a laboratory technician. Accordingly, the methods described herein are suitable and applicable for use in chair side, dental laboratory, or other environments.

A conventional scanner typically captures the shape of the physical impression/patient's dentition in 3 dimensions during a scan and digitizes the shape into a 3 dimensional digital model. The 3 dimensional digital model can include multiple interconnected polygons in a topology that corresponds to the shape of the physical impression/patient's dentition, for example, for a responding jaw. In some embodiments, the polygons can include two or more digital triangles. In some embodiments, the scanning process can produce STL, PLY, or CTM files, for example that can be suitable for use with a dental design software, such as FastDesign™ dental design software provided by Glidewell Laboratories of Newport Beach, Calif.

Figure 4:
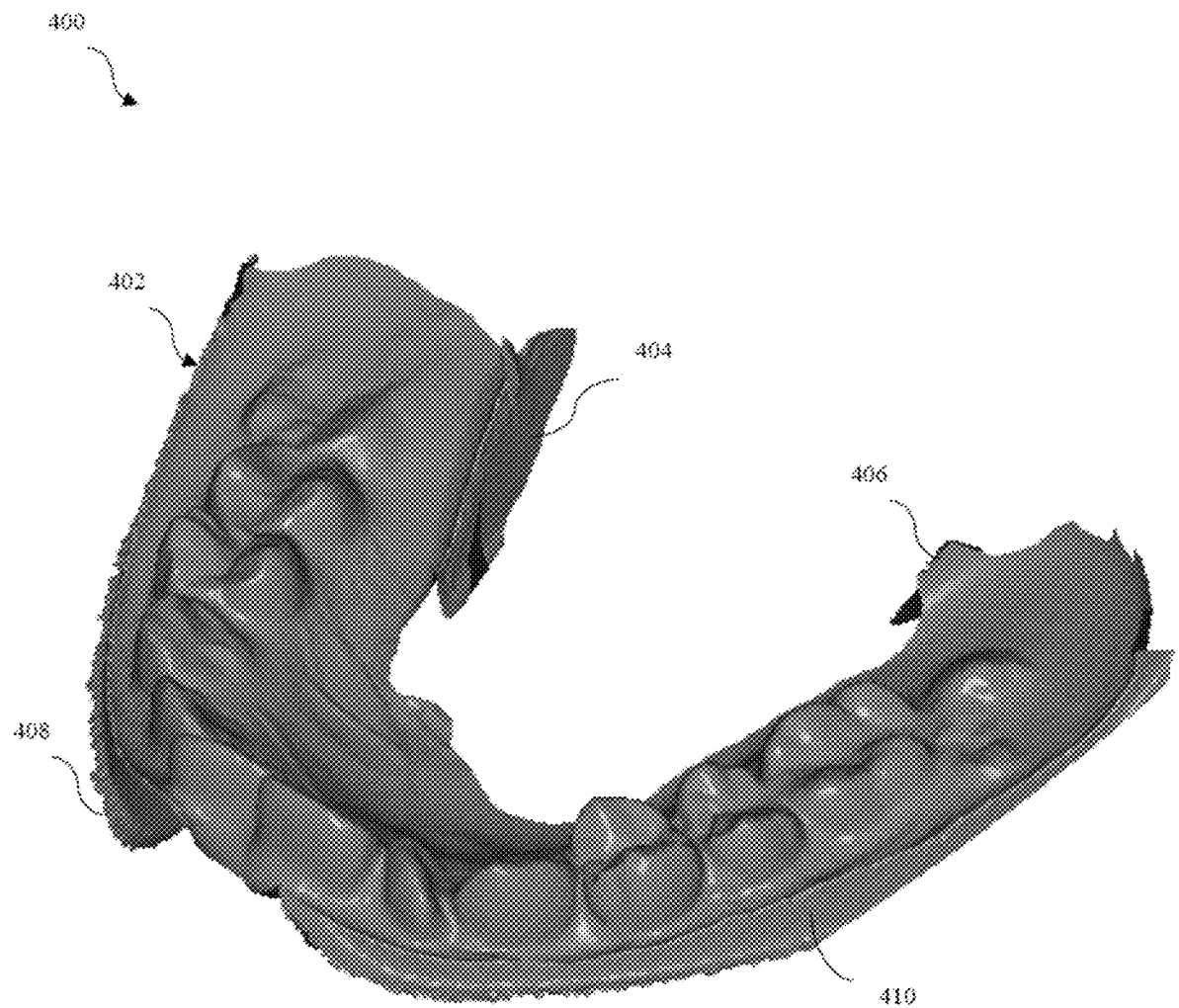
FIG. 4 shows a perspective view of an example of a 3D digital model of a digital jaw example in some embodiments.

FIG. 4 illustrates an example of a digital model 400 that can include a digital jaw 402, for example, that can be generated from a CT scan of a physical dental impression in some embodiments. As can be seen in the figure, digital surfaces from single jaw impression CT scans can contain undesirable regions that provide no information regarding a patient's dentition. For example, as can be seen in the figure, the digital jaw 402 can contain, for example, remnants of impression tray such as first undesirable region 404, second undesirable region 406, third undesirable region 408, and fourth undesirable region 410 in addition to valid dental data. Undesirable regions can exist in cases where intraoral/optical scans are used to generate the digital model as well. In some embodiments, the computer-implemented method can remove one or more undesirable regions by processing the digital jaw scan.

In some embodiments, processing the digital jaw scan can include performing segmentation on at least a portion of the digital jaw to provide one or more digital surface segments. In some embodiments, performing segmentation can include determining one or more geometric properties of boundaries between the one or more digital surface segments. In some embodiments, the geometric boundary can include a convex boundary in the case of a physical dental impression, for example. In some embodiments, the convex boundary can include the most convex portion of the digital surface. In the case of a direct scan of teeth such as with an optical scanner such as an intra oral scanner, for example, the boundary can be the most concave boundary between the one or more digital surface segments.

In some embodiments, performing segmentation can include performing curvature-based segmentation. In some embodiments, curvature-based segmentation can include curvature determination of digital surface regions in the digital model. In some embodiments, the computer-implemented method can receive a digital model and determine curvatures of digital surface regions. The computer-implemented method can determine curvature of digital surface regions using any technique. In some embodiments, curvature determination can be performed by the computer-implemented method automatically.

In some embodiments, the digital surface regions include triangles. The curvature of a triangle can be determined by taking an average of the curvature of the triangle's edges, or an average of the curvature of the triangle's vertices.

Figure 5:
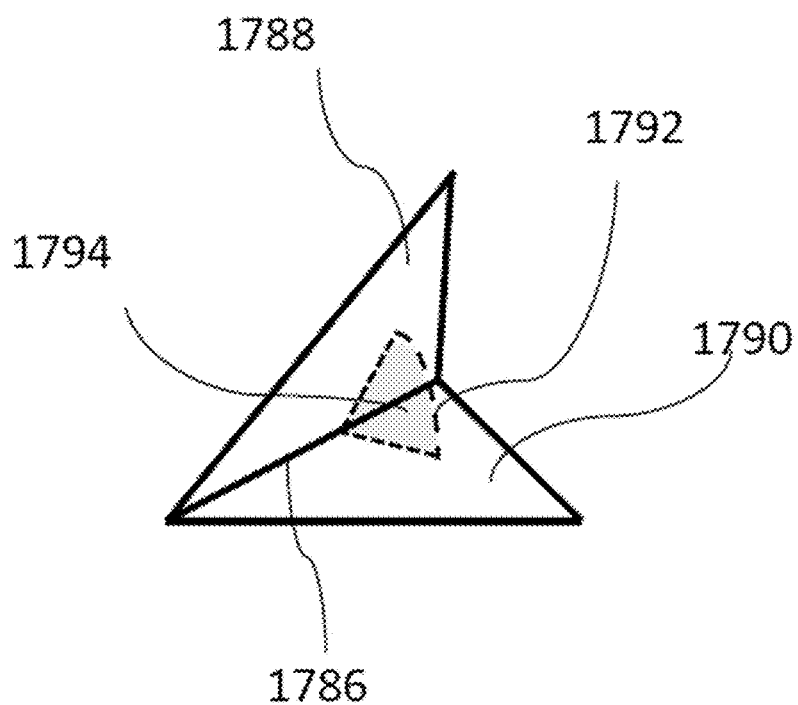
FIG. 5 shows a perspective view of an illustration of an example of digital surface triangles in some embodiments.

In some embodiments, the computer-implemented method can determine the curvature of the triangle by taking an average of the curvature of its edges. FIG. 5 illustrates one example of determining curvature at an edge 1786 connecting two triangles 1788 and 1790. In some embodiments, the computer-implemented method can determine the curvature at edge 1786 based on a dihedral angle 1792 formed at the edge 1786 between a particular triangle 1790 and its adjacent neighborhood triangle 1788 in the digital surface mesh as illustrated. The dihedral angle 1792 can be determined by the computer-implemented method as an angle formed between the two adjacent triangles 1788 and 1790 in a third plane 1794 that is perpendicular to the edge 1786 formed by the two adjacent triangles 1790 and 1788. For example, in some embodiments, the computer-implemented method can take the sin ($\varphi$), where $\varphi$ is a dihedral angle 1792 between two adjacent triangles 1790 and 1788. The computer-implemented method can repeat this curvature function at all triangle edges.

Alternatively, in some embodiments, the computer-implemented method can determine the curvature of the triangle by taking an average of the curvature of the triangle's vertices. For example, in some embodiments, the computer-implemented method can determine curvature at each vertex P by selecting a neighborhood of vertices (size N) around P, optionally using connection information to decrease the search space. The computer implemented method can fit a quadric patch $F(x,y,z)=0$ onto the neighborhood of points. The computer implemented method can determine a projection $P_0$ of P onto the patch, such that $F(P_0)=0$. The computer-implemented method can determine the curvature properties of F at $P_0$ and assign the curvature properties to P.

In some embodiments, the computer-implemented method can, for example, use quadric form $ax^2+by^2+cz^2+2exy+2fyz+2gzx+2lx+2my+2nz+d=0$ since each datum (x,y,z) will not lie perfectly on the surface of F. The computer-implemented method can determine the coefficients of the patch surface (a, b, c, e, f, g, l, m, n, d), from a 10×10 real symmetric eigenproblem of the form $A=D^TD$, where $D_i$ is the N×10 design matrix, each row of which is built up by $[x_i^2\ y_i^2\ z_i^2\ x_iy_i\ y_iz_i\ x_iz_i\ x_i\ y_i\ z_i\ 1]$, where i=1, ..., N. The matrix can have 10 real eigenvalues and 10 corresponding eigenvectors. The coefficients of the eigenvector corresponding to the smallest eigenvalue $\lambda_1$ are the coefficients a, b, c, e, f, g, l, m, n, d of the quadric surface that best approximates the point cloud locally around P. The computer-implemented method uses a, b, c, e, g, l, m, n to determine values E, F, G, L, M, N by letting $F(x,y,z)=ax^2+by^2+cz^2+exy+fyz+gxz+lx+my+nz+d=0$, an implicit quadric surface in $R^3$, so that first order partial derivatives are $F_x=2ax+ey+gz+l$, $F_y=2by+ex+fz+m$, and $F_z=2cz++gx+n$. The coefficients E, F, G are determined as $E=1+F_x^2/F_z^2$, $F=F_xF_y/F_z^2$, and $G=1+F_y^2/F_z^2$.

Since second order partial derivatives are $F_{xx}=2a$, $F_{yy}=2b$, $F_{zz}=2c$, $F_{xy}=F_{yx}=e$, $F_{yz}=F_{zy}=f$, and $F_{xz}=F_{zx}=g$ and the magnitude of the gradient is $|\nabla F|=\sqrt{F_x^2+F_y^2+F_z^2}$, then coefficients L, M, N of the Second Fundamental Form are:

$$L = \frac{1}{F_z^2|\nabla F|}\begin{vmatrix} F_{xx} & F_{xz} & F_x \\ F_{zx} & F_{zz} & F_z \\ F_x & F_z & 0 \end{vmatrix}, M = \frac{1}{F_z^2|\nabla F|}\begin{vmatrix} F_{xy} & F_{yz} & F_y \\ F_{zx} & F_{zz} & F_z \\ F_x & F_z & 0 \end{vmatrix},$$

$$N = \frac{1}{F_z^2|\nabla F|}\begin{vmatrix} F_{yy} & F_{yz} & F_y \\ F_{zy} & F_{zz} & F_z \\ F_y & F_z & 0 \end{vmatrix}$$

The computer-implemented method then determines matrices A and B from E, F, G, L, M, N as:

$$A = \begin{bmatrix} L & M \\ M & N \end{bmatrix} \text{ and } B = \begin{bmatrix} E & F \\ F & G \end{bmatrix}$$

and determines principle curvatures $k_1$ and $k_2$ as the eigenvalues of the matrix $B^{-1}*A$.

The computer-implemented method can apply a selected scalar function to the principal curvatures $k_1$ and $k_2$ to determine the selected curvature function ("SCF"). For example, for principle curvatures $k_1$ and $k_2$, the computer-implemented method can determine Gaussian curvature (K) as $K=k_1 k_2$ or mean curvature (H) as $H=\frac{1}{2}(k_1+k_2)$.

The radius of either method of determining curvature can be up to and including 60 digital vertices on average in the neighborhood of the vertex being evaluated, and can be a user selectable value. A selection of a smaller number of points and smaller radius can lead to faster computations, while selecting a larger number of points and larger radius can provide a more precise curvature estimation. The computer-implemented method can be repeated for all vertices of the digital surface mesh, for example.

In some embodiments, the computer-implemented method can segment the entire digital dental impression surface into one or more digital segments. In some embodiments, the computer-implemented method can segment the digital dental impression surface in three dimensions (3D) using curvature based segmentation. This can include, for example, watershed segmentation. Segmentation can be performed by the computer-implemented method automatically in some embodiments.

In some embodiments, the digital dental impression surface can include one or more triangles that connect at edges and vertices to form the digital surface mesh. In some embodiments, the computer-implemented method determines the curvature of every triangle in the digital surface mesh. The computer-implemented method can determine the curvature of each particular triangle by either determining the average curvature of the particular triangle's vertices or the average curvature of the particular triangle's edges as described previously.

Figure 6A:
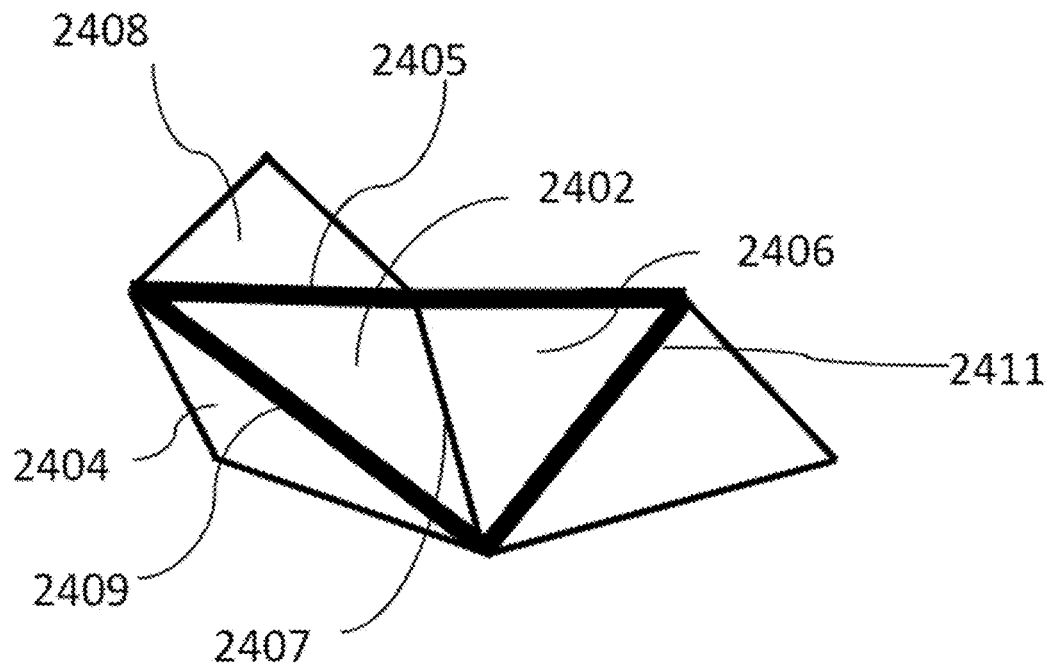
FIG. 6(a) illustrates an example in some embodiments of determining an average of the edge curvatures.

In one embodiment, the computer-implemented method can determine the curvature of a particular triangle by determining a curvature at each of the edge of the particular triangle and calculating an average of the edge curvatures as discussed earlier of the present disclosure. FIG. 6(a) illustrates an example in some embodiments of determining an average of the edge curvatures in which a particular triangle 2402 includes a first edge 2405, a second edge 2407, and a third edge at 2409. The computer-implemented method can determine the curvature at the first edge 2405 based on the dihedral angle between the particular triangle 2402 and adjacent triangle 2408. The computer-implemented method can determine the curvature at the second edge 2407 based on the dihedral angle as described in this disclosure between the particular triangle 2402 and adjacent triangle 2406. The computer-implemented method can determine the curvature at the third edge 2409 based on the dihedral angle between the particular triangle 2402 and adjacent triangle 2404. The computer-implemented method can then determine the average of the curvatures of the first edge 2405, the second edge 2407, and the third edge at 2409 to determine the curvature of the particular triangle 2402. The computer-implemented method can in some embodiments store the curvature of the particular triangle 2402 in a look-up table, for example. The computer-implemented method can repeat this process with every triangle in the digital surface mesh and determine the curvature at each triangle in the digital surface mesh.

In some embodiments, the computer-implemented method can assign a user-selectable positive or negative sign to each triangle's curvature. For example, the sign of convex and convex regions can be set arbitrarily. In some embodiments, the computer-implemented method can assign convex regions a positive sign.

After determining each particular triangle's curvature, the computer-implemented method can segment triangles based on 3D curvature-based segmentation. In some embodiments, performing segmentation can include performing watershed segmentation to generate one or more initial digital surface segments. For example, in some embodiments, the computer-implemented method can determine the curvature for each triangle. The curvature of each triangle can, in some embodiments, be stored in a lookup table. The computer implemented-method can start with a triangle with a minimum curvature as a particular triangle being evaluated. The computer-implemented method can look up the curvatures of triangles in the neighborhood of the particular triangle being evaluated from the look up table, for example. In some embodiments, the computer-implemented method can determine neighboring triangle curvatures from the look-up table. Any neighboring triangles with curvatures greater than the particular triangle being evaluated can be added to a segment to which the particular triangle being evaluated belongs. Any neighboring triangles with curvatures less than the curvature of the particular triangle are not added to the particular triangle's segment. The computer-implemented method can then select a neighborhood triangle as the next particular triangle to be evaluated and repeats the process for every triangle.

Figure 6B:
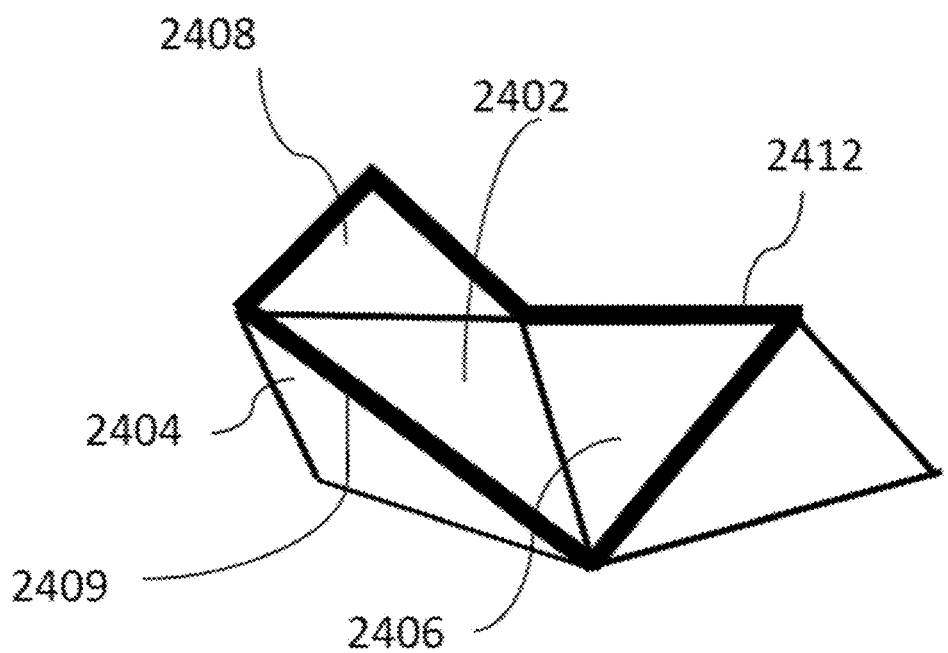
FIG. 6(b) shows a perspective view of an illustration of an example in some embodiments of merging.
Figure 6C:
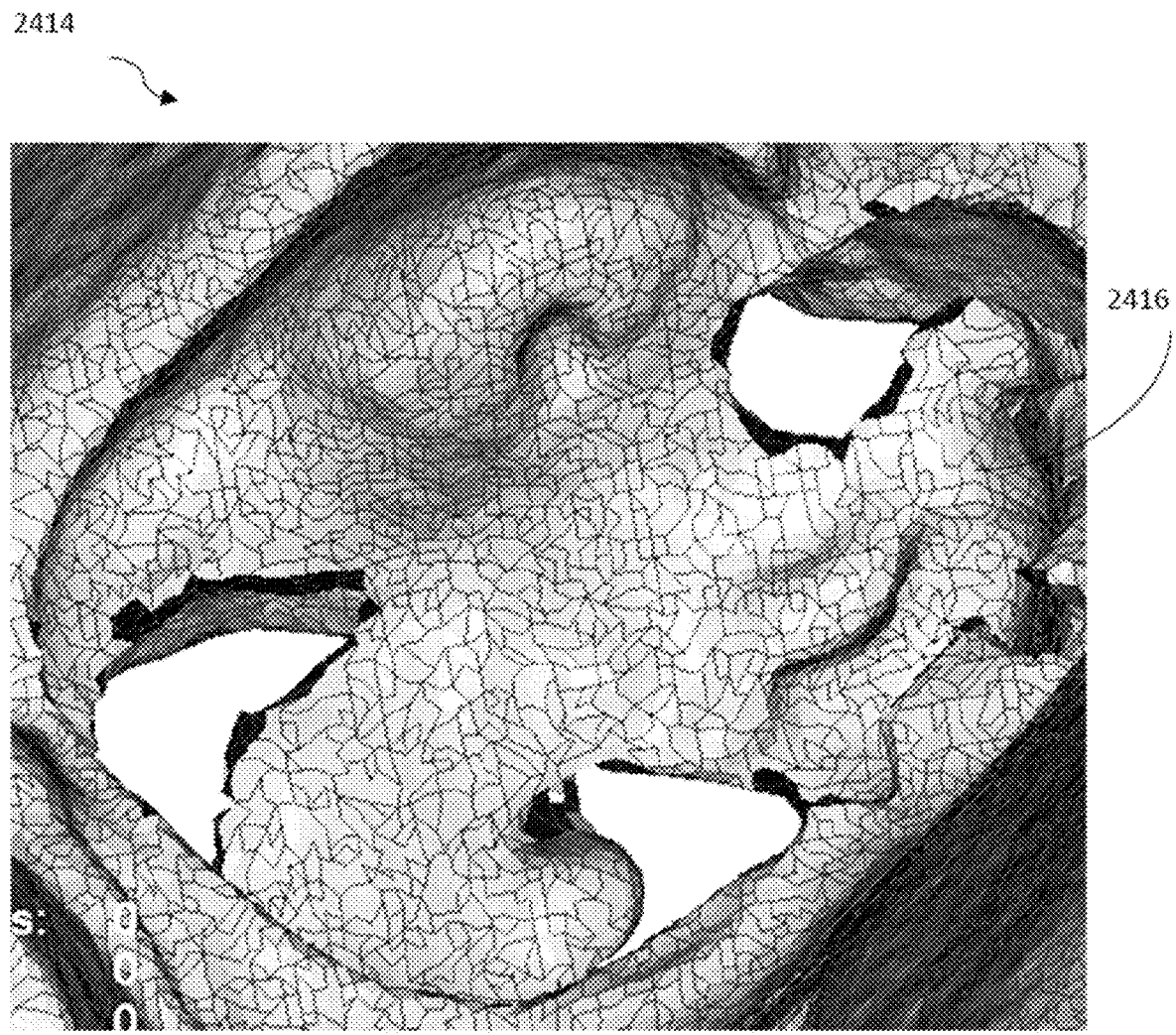
FIG. 6(c) illustrates one example of a segmented digital surface mesh in some embodiments.

FIG. 6(a) illustrates an example in some embodiments of watershed segmentation of triangles. As discussed herein, the computer-implemented method determines the curvature of all of the triangles in the digital surface mesh. In one embodiment, the computer-implemented method stores the curvatures of the triangles in a lookup table. The computer-implemented method can identify the triangle with the minimum curvature, for example, particular triangle 2402. In some embodiments, the computer-implemented method can determine the triangle with the minimum curvature using the look up table. The computer-implemented method determines the curvatures of neighboring triangles 2404, 2408 and 2406. In some embodiments, the computer-implemented method can determine the curvatures of neighboring triangles from the lookup table. In the example, if the neighboring triangle 2406 has a greater curvature compared to the curvature of triangle 2402, then the neighboring triangle 2406 can be considered as part of the same watershed as the particular triangle 2402. The computer-implemented method combines the digital surface triangle 2402 with triangle 2406 into a single segment such as segment 2411 as illustrated in FIG. 6(*a*).

The computer-implemented method next can compare the curvature of neighboring triangle 2404 with the curvature of the particular triangle 2402, for example. If, for example, the curvature of neighboring triangle 2408 is greater than the minimum curvature (i.e. the curvature of 2402), then the triangle 2408 is merged with the segment 2411 containing triangle 2402. As illustrated in FIG. 6(*b*), segment 2412 is formed after merging triangle 2408.

If a neighborhood triangle has a lower curvature than the particular triangle 2402 in question, then the neighborhood triangle is not merged with the segment containing the particular triangle 2402 by the computer-implemented method. For example, if neighboring triangle 2404 has a lower curvature than the triangle 2402, then 2404 is not merged with the segment 2412 to which particular triangle 2402 belongs.

After processing a first particular triangle, the computer-implemented method changes to a new particular triangle which can be a neighboring triangle of the first particular triangle. The computer-implemented method can repeat determining segmentation with the new particular triangle being evaluated and segment the entire digital surface. FIG. 6(*c*) illustrates one example of a segmented digital surface mesh 2414 that includes segment 2416 for example.

Figure 7:
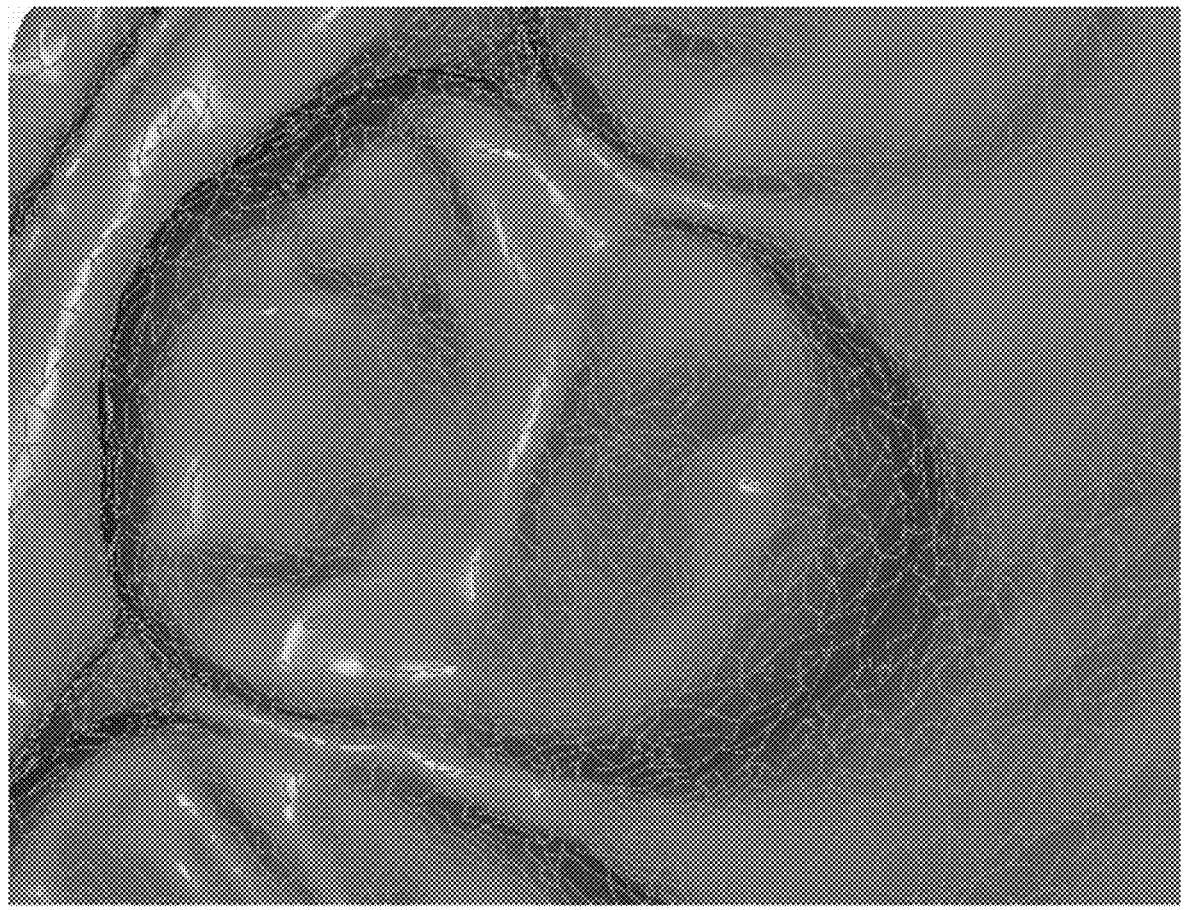
FIG. 7 shows a perspective view of an example of a 3D digital model of a portion of a segmented digital jaw in some embodiments.

After performing segmentation of triangles, the digital surface mesh can contain a large number of small segments as illustrated in FIG. 7. In some embodiments, the number of segments can optionally be reduced by the computer-implemented method by merging two or more segments together.

In some embodiments, the computer-implemented method can merge small segments into larger ones based on geometric attributes such as their average curvature, average size, area, perimeter, perimeter to area ratio, and/or other geometric factors. In some embodiments, the computer-implemented method can merge the one or more initial digital surface segments into one or more merged digital surface segments.

In some embodiments, merging can include determining a merge metric for each pair of adjacent initial digital surface segments based on a perimeter of the after-merged segment and an average mean curvature on a boundary between the pair of adjacent initial digital surface segments. For example, a merge metric can be determined as follows in some embodiments:

$$m=-p*c$$

where m is the merge metric, p is the perimeter of the proposed after-merged segment, and c is the average mean curvature on a boundary between the two segments to be merged. In some embodiments, this is merge metric used in the case of digital models of dental impressions. In some embodiments, in the case of digital models of directly scanned dentition, the merge priority is m=p*c.

In some embodiments, merging can include merging adjacent initial digital surface segments based on the merge metric. In some embodiments, merging can include merging adjacent initial digital surface segments starting from the greatest merge metric value and then updating the merge metrics after the merge occurs. In some embodiments, merging terminates when the largest merge metric falls below a user-configurable merge metric threshold. In some embodiments, the user-configurable merge metric threshold is negative 500. In some embodiments, smaller initial digital surface segments can be prioritized during merging. In some embodiments, smaller segments are merged first due to the p term, as are segments with small curvature in between due to the c term. The result of merging can be, for example, a few large segments with high convex curvature between the segments in the case of digital models of dental impressions, and high concave curvature between the segments in the case of digital models of directly scanned dentition.

Figure 8:
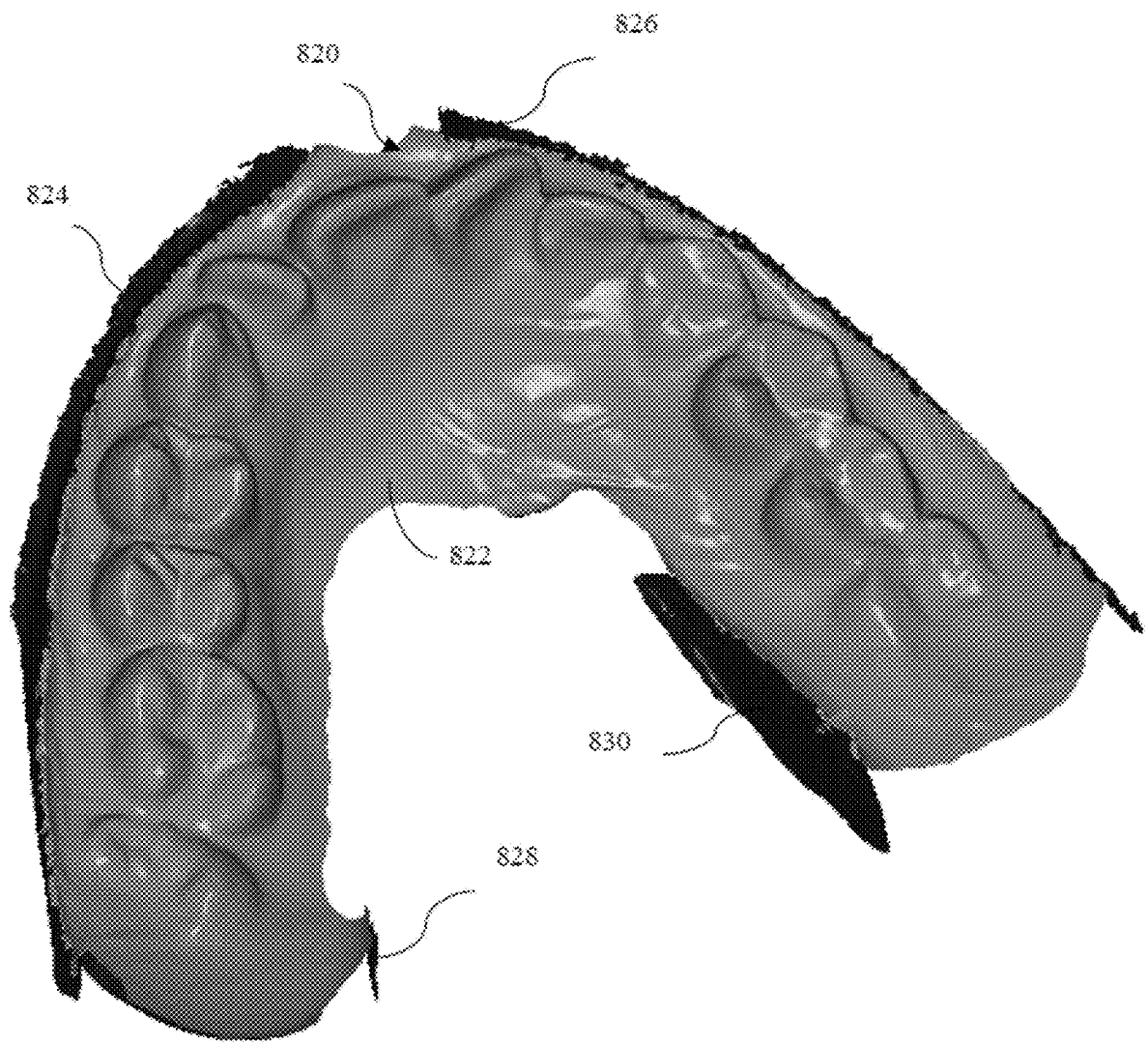
FIG. 8 shows a perspective view of an example of a 3D digital model of a portion of a segmented digital jaw in some embodiments.

FIG. 8 illustrates an example of a digital jaw 820 after merging. As can be seen in the figure, the merged jaw can include one or more final segments such as first final segment 822, second final segment 824, third final segment 826, fourth final segment 828, and fifth final segment 830. As illustrated in the figure, the first final segment 822 is the largest segment, with the remaining segments being smaller.

Merging can be performed automatically by the computer-implemented method in some embodiments.

In some embodiments, the computer-implemented method determines a merge-priority for every two neighboring segments. The computer-implemented method can determine merge-priority of two neighboring segments based on their attributes. If two segments can merge based on their attributes, then in some embodiments the computer-implemented method determines priority based on geometric factors. For example, the computer-implemented method can determine priority based on –p*c as discussed earlier in the case of digital models of dental impressions, and based on p*c as discussed earlier in the case of digital models of directly scanned dentition such as intraoral scanners, for example.

In some embodiments, the computer-implemented method can store priorities in a priority-queue. The computer-implemented method can extract the highest priority from the queue, merge the corresponding two segments, and update the priorities between newly formed segments and their neighbors in the queue. The computer-implemented method can repeat this process until no two segments can be merged any more.

Some embodiments of the computer-implemented method can include determining a digital tooth center for at least one digital tooth in the digital jaw. In some embodiments, determining the digital tooth center can include determining a bounding region for one or more digital teeth in the digital jaw. In some embodiments, the computer-implemented method can determine a bounding region by using a trained neural network. In some embodiments, the bounding region can be a bounding box, for example.

Neural networks are computational models that are part of machine learning. A neural network typically includes nodes organized in layers. The layers of nodes can include, for example, an input layer, one or more hidden layers, and an output layer. A neural network with more than one hidden layer—typically many more hidden layers—is a deep neural network ("DNN"). Information from one layer can be processed and provided to a next layer.

In some embodiments, the DNN can be a convolutional neural network ("CNN"), which is a network that uses convolution in place of the general matrix multiplication in at least one of the hidden layers of the deep neural network. A convolution layer can calculate its output values by applying a kernel function to a subset of values of a previous layer. The computer-implemented method can train the CNN by adjusting weights of the kernel function based on the training data. The same kernel function can be used to calculate each value in a particular convolution layer. One advantage to using a CNN can include learning fewer weights during training. Another advantage of using a CNN can be detecting edge features, for example.

Figure 9A:
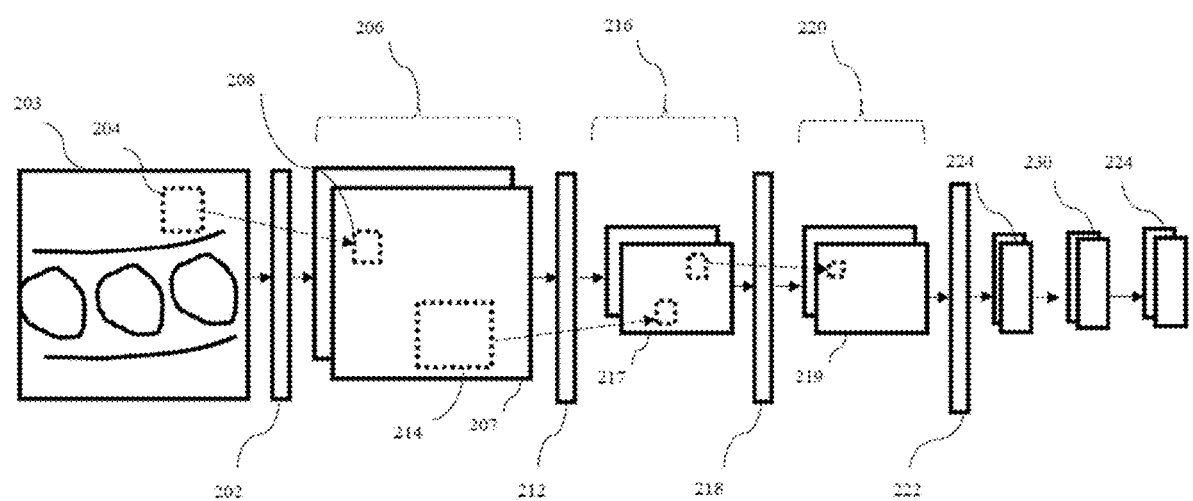
FIG. 9(a) shows a diagram of an example of a neural network in some embodiments.

FIG. 9(a) illustrates an example of a CNN in some embodiments. The CNN can include one or more convolution layers, such as first convolution layer 202. The first convolution layer 202 can apply a kernel (also referred to as a filter) such as kernel 204 across an input image such as input image 203 and optionally apply an activation function to generate one or more convolution outputs such as first kernel output 208. The first convolution layer 202 can include one or more feature channels. The application of the kernel such as kernel 204 and optionally an activation function can produce a first convoluted output such as convoluted output 206. The kernel can then advance to the next set of pixels in the input image 203 based on a stride length and apply the kernel 204 and optionally an activation function to produce a second kernel output. The kernel can be advanced in this manner until it has been applied to all pixels in the input image 203. In this manner, the CNN can generate a first convoluted image 206, which can include one or more feature channels. The first convoluted image 206 can include one or more feature channels such as 207 in some embodiments. In some cases, the activation function can be, for example, a RELU activation function. Other types of activation functions can also be used.

The CNN can also include one or more pooling layers such as first pooling layer 212. First pooling layer can apply a filter such as pooling filter 214, to the first convoluted image 206. Any type of filter can be used. For example, the filter can be a max filter (outputting the maximum value of the pixels over which the filter is applied) or an average filter (outputting the average value of the pixels over which the filter is applied). The one or more pooling layer(s) can down sample and reduce the size of the input matrix. For example, first pooling layer 212 can reduce/down sample first convoluted image 206 by applying first pooling filter 214 to provide first pooled image 216. The first pooled image 216 can include one or more feature channels 217. The CNN can optionally apply one or more additional convolution layers (and activation functions) and pooling layers. For example, the CNN can apply a second convolution layer 218 and optionally an activation function to output a second convoluted image 220 that can include one or more feature channels 219. A second pooling layer 222 can apply a pooling filter to the second convoluted image 220 to generate a second pooled image 224 that can include one or more feature channels. The CNN can include one or more convolution layers (and activation functions) and one or more corresponding pooling layers. The output of the CNN can be optionally sent to a fully connected layer, which can be part of one or more fully connected layers 230. The one or more fully connected layers can provide an output prediction such as output prediction 224. In some embodiments, the output prediction 224 can include labels of teeth and surrounding tissue, for example.

In some embodiments, the neural network can receive a 2D depth map of the 3D digital model and provide a bounding region around one or more digital teeth in the 2D depth map. In some embodiments, determining a digital tooth area is based off of a depth map. In some embodiments, the depth map is generated a depth map based on an occlusion direction. In some embodiments, the computer-implemented method can generate the 2D depth map. In some embodiments, the computer-implemented method can determine an occlusion direction. In some embodiments, the bounding region can be a bounding box, for example.

Some embodiments of the computer-implemented method can include generating a 2D image from the 3D digital model. In some embodiments, the 2D image can be a 2D depth map. The 2D depth map can include a 2D image that contains in each pixel a distance from an orthographic camera to an object along a line passing through the pixel. The object can be, for example, a digital jaw model surface, in some embodiments, for example. In some embodiments, an input can include, for example, an object such as a 3D digital model of patient's dentition ("digital model"), such as a jaw, and a camera orientation. In some embodiments, the camera orientation can be determined based on an occlusion direction. The occlusal direction is a normal to an occlusal plane and the occlusal plane can be determined for the digital model using any technique known in the art. For example, one technique is described in AN AUTOMATIC AND ROBUST ALGORITHM OF REESTABLISHMENT OF DIGITAL DENTAL OCCLUSION, by Yu-Bing Chang, James J. Xia, Jaime Gateno, Zixiang Xiong, Fellow, IEEE, Xiaobo Zhou, and Stephen T. C. Wong in IEEE TRANSACTIONS ON MEDICAL IMAGING, VOL. 29, NO. 9, September 2010, the entirety of which is incorporated by reference herein. Alternatively, in some embodiments, the occlusal direction can be specified by a user using an input device such as a mouse or touch screen to manipulate the digital model on a display, for example, as described herein. In some embodiments, the occlusal direction can be determined, for example, using the Occlusion Axis techniques described in PROCESSING DIGITAL DENTAL IMPRESSION U.S. patent application Ser. No. 16/451,968, of Nikolskiy et al., the entirety of which is incorporated by reference herein.

Figure 9B:
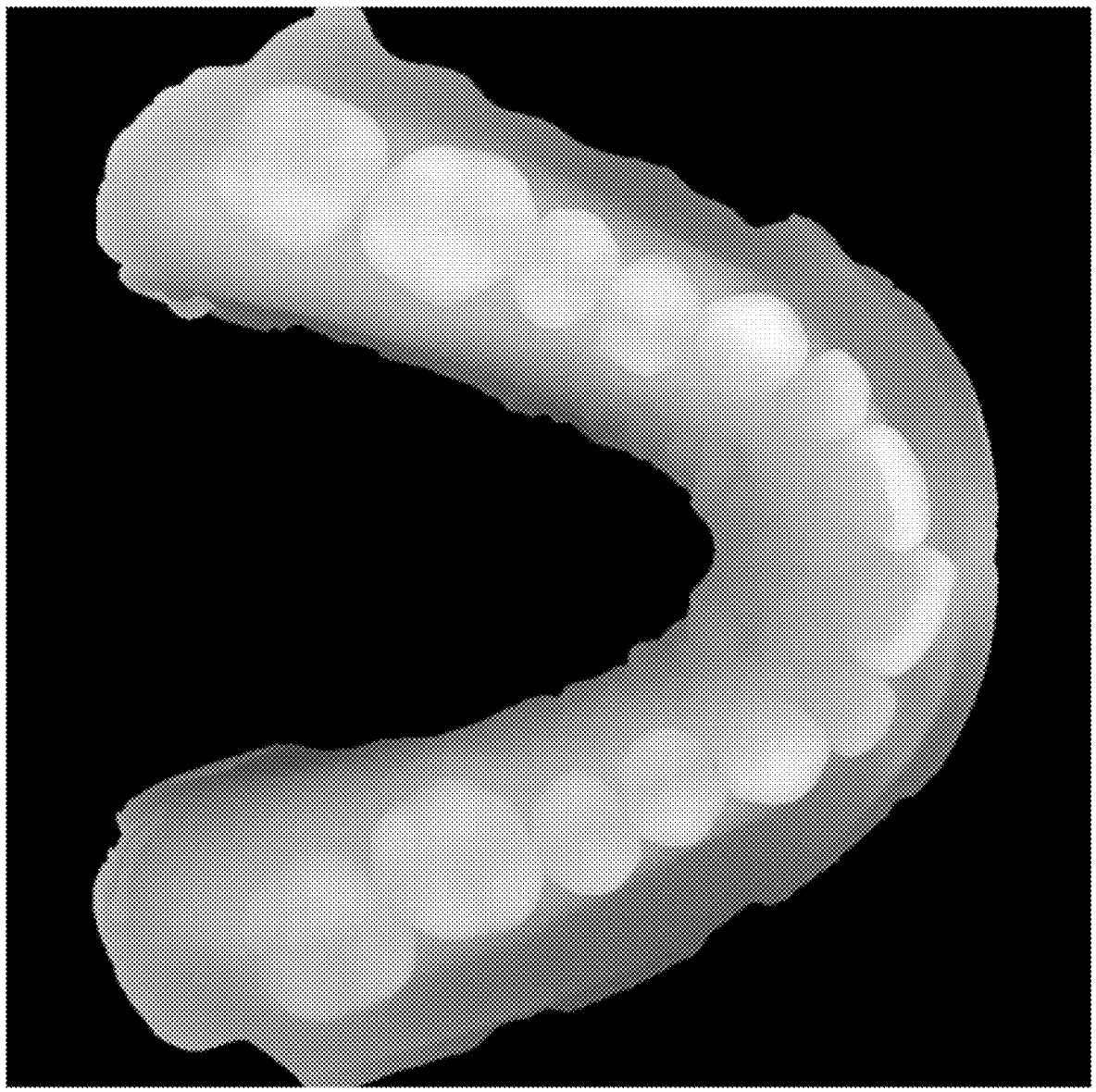
FIG. 9(b) shows a perspective view of an example 2D depth map.

The 2D depth map can be generated using any technique known in the art, including, for example z-buffer or ray tracing. For example, in some embodiments, the computer-implemented method can initialize the depth of each pixel (j, k) to a maximum length and a pixel color to a background color, for example. The computer-implemented method can for each pixel in a polygon's projection onto a digital surface such as a 3D digital model determine a depth, z of the polygon at (x, y) corresponding to pixel (j, k). If z<depth of pixel (j, k), then set the depth of the pixel to the depth, z. "Z" can refer to a convention that the central axis of view of a camera is in the direction of the camera's z-axis, and not necessarily to the absolute z axis of a scene. In some embodiments, the computer-implemented method can also set a pixel color to something other than a background color for example. In some embodiments, the polygon can be a digital triangle, for example. In some embodiments, the depth in the map can be per pixel. FIG. 9(b) illustrates an example of a 2D depth map of a digital model in some embodiments.

Figure 9C:
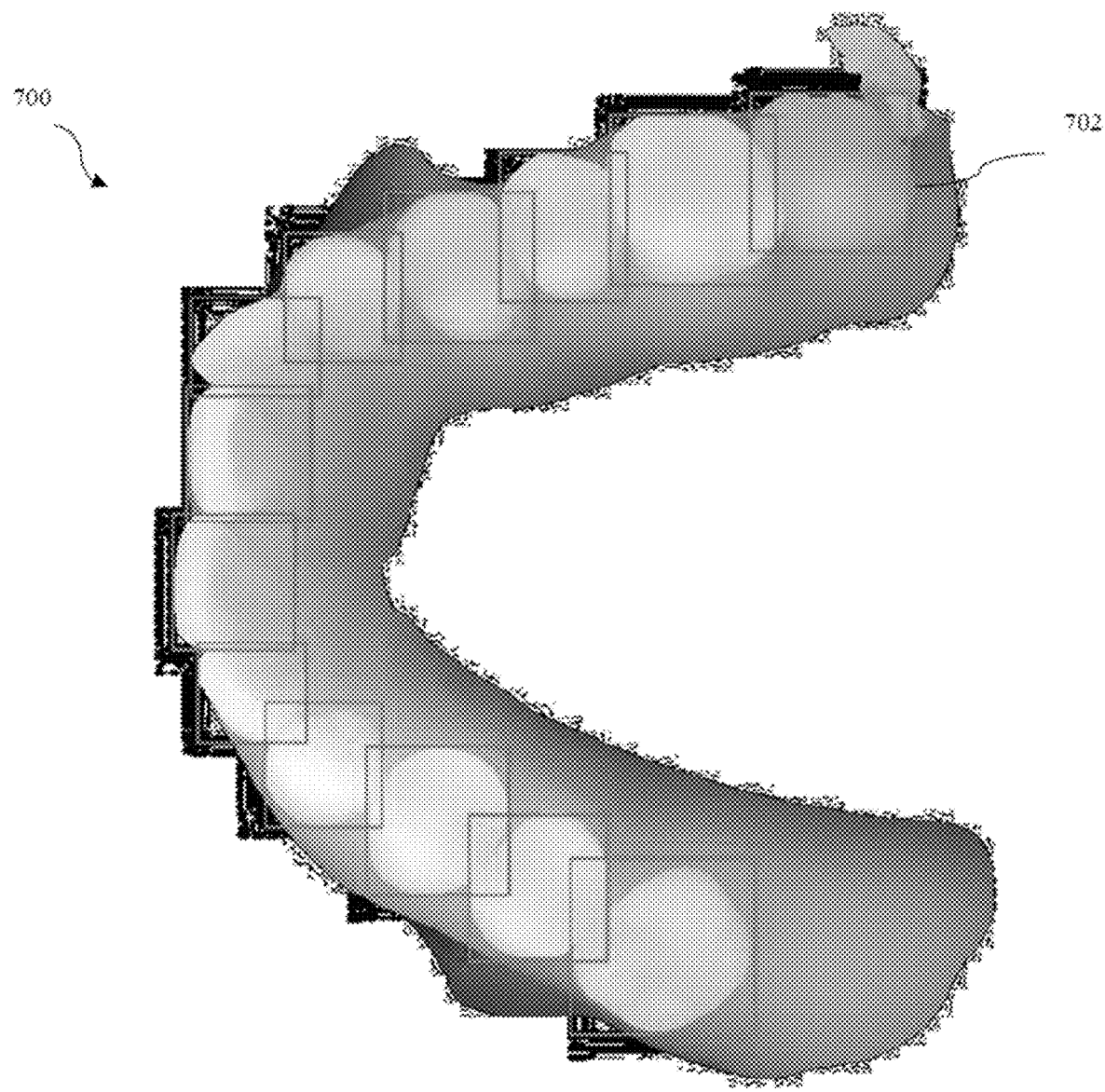
FIG. 9(c) shows a perspective view of an example 2D depth map with bounding regions.

In some embodiments, the neural network can be trained by providing a 2D depth map training dataset that can include one or more 2D depth maps of at least a portion of a digital dental arch having one or more digital teeth, with each digital tooth marked with a marked digital tooth bounding region, such as a rectangular shaped boundary, for example. Other shapes for the marked digital tooth bounding region can also be used. To generate the training dataset, each digital tooth in each 2D depth map in the training dataset can be marked by a digital tooth bounding region. FIG. 9(c) illustrates an example of a 2D depth map 700 with a marked digital tooth bounding region 702. The marked digital tooth bounding region for each digital tooth in the 2D depth map can be marked manually by a user or technician, for example or by an automatic process in some embodiments. In some embodiments, the computer-implemented method can provide the 2D depth map training set to a neural network to provide a 2D depth map trained neural network. The 2D depth map trained neural network can, in some embodiments, receive one or more 2D depth maps and generate a digital tooth bounding region for each digital tooth in the 2D depth map automatically. In some embodiments, the bounding region can be a bounding box, for example.

CNNs can be structured and used in different ways. In some embodiments, the neural network can include a YOLO neural network. For example, details of an example of a You Only Look Once ("YOLO") network are described in *You Only Look Once: Unified, Real-Time Object Detection*, by Joseph Redmon, Santosh Divvala, Ross Girshick, Ali Farhadi, submitted 8 Jun. 2015, last revised 9 May 2016, v5, the entirety of which is hereby incorporated by reference. Additional details of a YOLO network can be found in *YOLO9000: Better, Faster, Stronger*, by Joseph Redmon, Ali Farhadi, University of Washington, Allen Institute for AI, published 25 Dec. 2016, arXiv, the entirety of which is hereby incorporated by reference. Details of an example of a YOLO network are also described in *YOLOv3: An Incremental Improvement*, by Joseph Redmon and Ali Farhadi, University of Washington, published 2018, ArXiv, the entirety of which is hereby incorporated by reference. A trained YOLO network can receive, for example, a 2D digital model of patient's dentition and output the digital model with a digital bounding box as the digital tooth bounding region around each digital tooth.

A YOLOv3 network (hereinafter, "YOLO network" or "YOLO") as described can include one or more convolutional networks that predict multiple bounding boxes and class probability for each bounding box. In some embodiments, the YOLO network can divide an input image into a S×S grid. Each of grid cells can predict B bounding boxes and can determine confidence scores for the bounding boxes. The confidence scores can indicate the model's confidence that the bounding box contains an object as well as the accuracy of the predicted box. Confidence can be expressed as $Pr(Object)*IOU_{pred}^{truth}$, where IOU is intersection over union.

In some embodiments, YOLO can use dimension clusters as anchor boxes to predict bounding boxes. For example, YOLO can predict four coordinates for a bounding box: $t_x$, $t_y$, $t_w$, $t_h$. If a cell is offset from the left top corner of the image by $(C_x, C_y)$ and a prior bounding box has width $p_w$ and a height $p_h$, the predictions can correspond to:

$$b_x = \sigma(t_x) + c_x$$

$$b_y = \sigma(t_y) + c_y$$

$$b_w = p_w e^{t_w}$$

$$b_h = p_h e^{t_h}$$

where box center coordinates relative to the filter application location are predicted using a sigmoid function (providing σ). In some embodiments, YOLO can predict each bounding box's objectness score by performing logistic regression. The result can be 1 if the prior bounding box overlaps a ground truth object by more than any other prior bounding box. A prior bounding box that is not best but that overlaps a ground truth object by more than a threshold such as 0.5 can be ignored. Other threshold values can be used and can be set in a user configurable file, for example. A prior bounding box not assigned to a ground truth object incurs a loss for objectness, but not coordinate or class prediction. In some embodiments, each box can predict classes within the bounding box by utilizing multilabel classification. For example, independent logistic classifiers can be used. Binary cross-entropy loss for class predictions can be used in training. YOLO can make predictions across scales. For example, YOLO can predict boxes at three different scales. Features can be extracted from the scales. Several convolutional layers can be added to the base feature extractor. The final convolutional layer can predict a 3D tensor encoding bounding box, objectness, and class predictions. The tensor can be N×N×[(number of boxes at each scale)*(4+1+(number of class predictions))]. For example, the number of boxes at each scale can be 3, and the class prediction number can be 80 class predictions. YOLO can obtain a feature map from two layers previous and up-sample the feature map. For example, YOLO can up-sample the feature map by 2×. Another previous feature map can be concatenated with the up-sampled feature map to provide a combined feature map. One or more convolutional layers can be added to process the combined feature map and provide a second tensor of twice the size. The same design can be performed a final time to predict boxes for the final scale. K-means clustering can be used to determine prior bounding box values. For example, 9 clusters and 3 scales can be used and the clusters divided evenly across the scales.

Figure 9D:
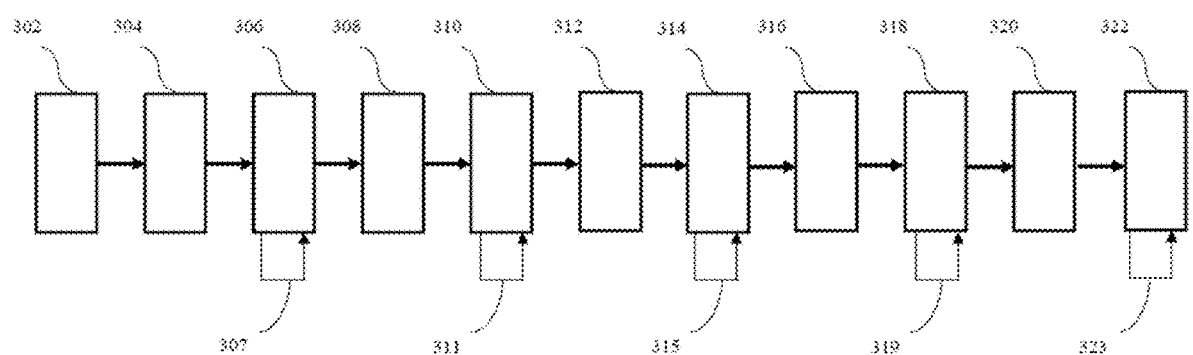
FIG. 9(d) shows a diagram of an example of a YOLO neural network in some embodiments.

In some embodiments, YOLO can perform feature extraction using one or more convolution layers. One or more of the convolution layers can optionally include residual operations. FIG. 9(d) illustrates an example of YOLO feature extraction. The following indicates the operations performed at each layer as an example:

| LAYER REF # | TYPE | FILTERS | SIZE | OUTPUT |
|---|---|---|---|---|
| Layer 302: | convolutional | 32 | 3 × 3 | 256 × 256 |
| Layer 304: | convolutional | 64 | 3 × 3/2 | 128 × 128 |
| Layer 306: | convolutional | 32 | 1 × 1 | |
| | convolutional | 64 | 3 × 3 | |
| | residual 307 | | | 64 × 64 |
| Layer 308: | convolutional | 128 | 3 × 3/2 | 64 × 64 |
| Layer 310: | convolutional | 64 | 1 × 1 | |
| | convolutional | 128 | 3 × 3 | |
| | residual 311 | | | 64 × 64 |
| Layer 312: | convolutional | 256 | 3 × 3/2 | 32 × 32 |
| Layer 314: | convolutional | 128 | 1 × 1 | |
| | convolutional | 256 | 3 × 3 | |
| | residual 315 | | | 32 × 32 |
| Layer 316: | convolutional | 512 | 3 × 3/2 | 16 × 16 |
| Layer 318: | convolutional | 256 | 1 × 1 | |
| | convolutional | 512 | 3 × 3 | |
| | residual 319 | | | 16 × 16 |
| Layer 320: | convolutional | 1024 | 3 × 3/2 | 8 × 8 |
| Layer 322: | convolutional | 512 | 1 × 1 | |
| | convolutional | 1024 | 3 × 3 | |
| | residual 323 | | | 8 × 8 |

Layer 310 can be performed 2×, Layer 314 can be performed 8×, layer 318 can be performed 8×, and layer 322 can be performed 4×, bringing the total number of convolutions for the entire network to 53 convolutions. The avgpool can be global. Other arrangements and variations are also contemplated in the YOLO network. In some embodiments, a trained YOLO network can receive an image and provide bounding regions around each feature in the image. The features can be defined during training. YOLO training can include minimizing loss functions. The loss function only penalizes classification errors when an object is in the particular grid cell. The loss function penalizes bounding box coordinate errors if a particular predictor is responsible for the ground truth box. For example, if the particular predictor has the highest IOU of all predictors in the particular grid cell.

In some embodiments, the computer-implemented method can train a YOLO network with one or more 2D depth maps, each with marked digital tooth bounding regions shaped as rectangles or boxes. In some embodiments, the training dataset can include 10,000 2D depth map images, for example. Other suitable numbers of 2D depth map images can be used as the training dataset in some embodiments, for example.

Figure 9E:
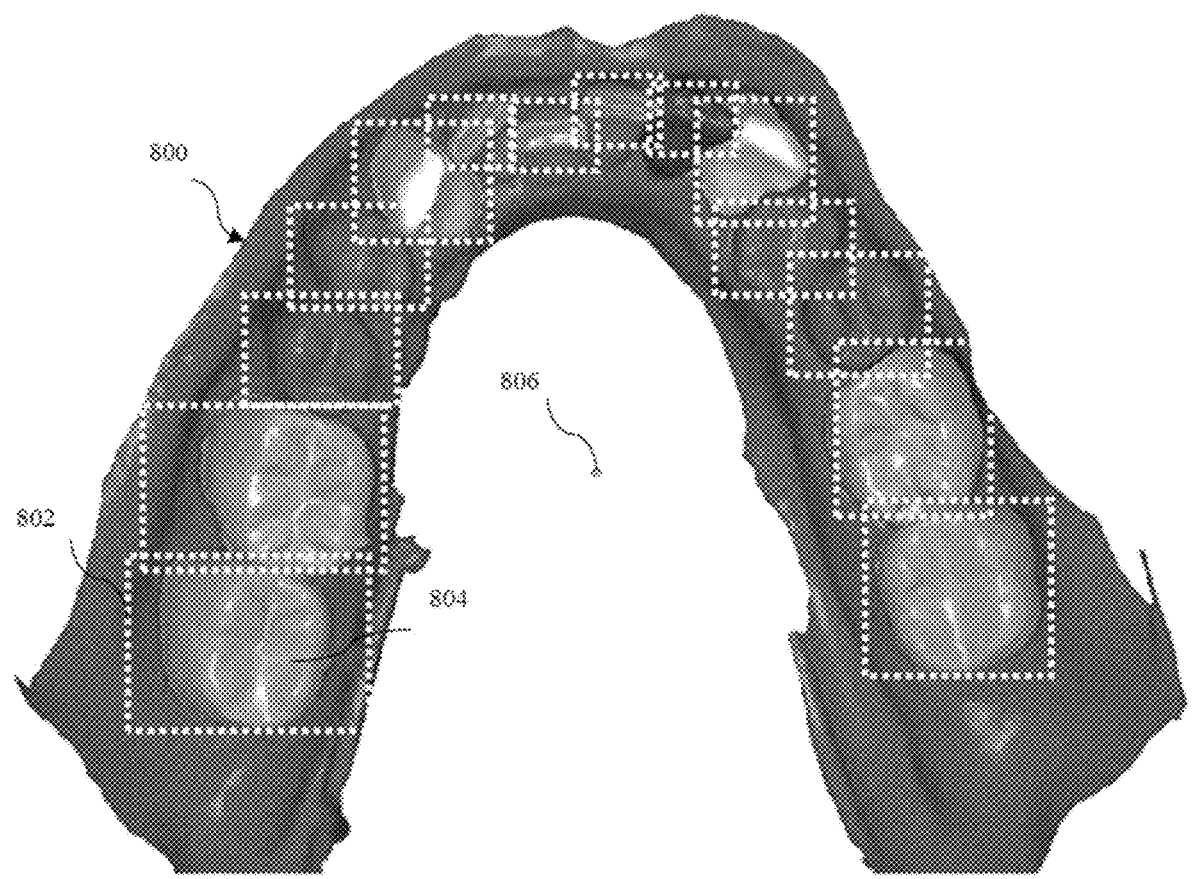
FIG. 9(e) shows a perspective view of an example 2D depth map with bounding regions.

After training, in some embodiments, the 2D depth map trained neural network can receive one or more unmarked 2D depth maps each having a digital dental arch and provide a digital tooth bounding region for each digital tooth in at least a portion of each digital dental arch. In some embodiments, the computer-implemented method can use the trained neural network to roughly define a digital tooth bounding region around each digital tooth, for example. Each digital tooth bounding region can provide a rough approximation of the position of each tooth when viewed from an occlusal direction. FIG. 9(e) illustrates an example of a digital model 800 having a digital dental arch with one or more digital teeth that includes digital tooth bounding regions around each digital tooth. In the example, the digital tooth bounding region is a digital bounding box 802 which bounds digital tooth 804 when viewed from the occlusal direction 806. Although a bounding box 802 is shown, each digital tooth bounding region can be of any suitable shape and/or size to bound the particular digital tooth in some embodiments.

In some embodiments, the 2D depth map trained neural network is a 2D depth map trained convolutional neural network as described previously. In some embodiments, the 2D depth map trained CNN can be a 2D depth map trained YOLO network as described previously. The trained 2D depth map YOLO network can receive a 2D depth map and can provide a digital tooth bounding region for each digital tooth in at least a portion of the 2D depth map. The computer-implemented method can label all pixels bounded by a digital tooth bounding region with a unique label in some embodiments for example. The digital tooth bounding regions provided by a trained 2D depth map YOLO network can be digital tooth bounding boxes, for example. Thus, in some embodiments, the computer-implemented method can receive a 2D depth map and, using one or more 2D depth map trained neural networks, label one or more regions of the 2D depth map to provide the labeled 2D depth map. The trained neural network can be a YOLO network. In some embodiments, the computer-implemented method can receive a 2D depth map and, using one or more 2D depth map trained neural networks, label one or more regions of the 2D depth map to provide the labeled 2D depth map.

Although certain values and arrangements are discussed for one or more features in the one or more neural networks, the values are provided as examples only. Other suitable values, arrangements, and variations are contemplated and can be used.

In some embodiments, the computer-implemented method can train and use any CNN to receive a 2D depth map and determine a digital tooth bounding region for each digital tooth in the 2D depth map. For example, other CNNs such as RetinaNet, Feature Pyramid Network ("FPN"), Fast Region-based Convolutional Network ("FRCN"), Region-based Fully Convolutional Network ("R-FCN"), or any other type of CNN known in the art can be trained and used as described in the present disclosure in place of the YOLO network.

An example of RetinaNet can be found in "Focal Loss for Dense Object Detection", Lin, Tsung-Yi & Goyal, Priyal & Girshick, Ross & He, Kaiming & Dollar, Piotr, (2018), IEEE Transactions on Pattern Analysis and Machine Intelligence, PP. 1-1, the entirety of which is hereby incorporated by reference. An example of a Feature Pyramid Network can be found in "Feature Pyramid Networks for Object Detection," T. Lin, P. Dollar, R. Girshick, K. He, B. Hariharan and S. Belongie, 2017 IEEE Conference on Computer Vision and Pattern Recognition (CVPR), Honolulu, HI, USA, 2017, pp. 936-944, the entirety of which is hereby incorporated by reference. An example of a Fast Region-based Convolutional Network can be found in "Fast R-CNN," R. Girshick, 2015 IEEE International Conference on Computer Vision (ICCV), Santiago, Chile, 2015, pp. 1440-1448, the entirety of which is hereby incorporated by reference. An example of a Region-based Fully Convolutional Network can be found in "R-FCN: Object Detection via Region-based Fully Convolutional Networks", Jifeng Dai, Yi Li, Kaiming He, Jian Sun, 30th Conference on Neural Information Processing Systems (NIPS 2016), Barcelona, Spain, the entirety of which is hereby incorporated by reference.

Figure 10:
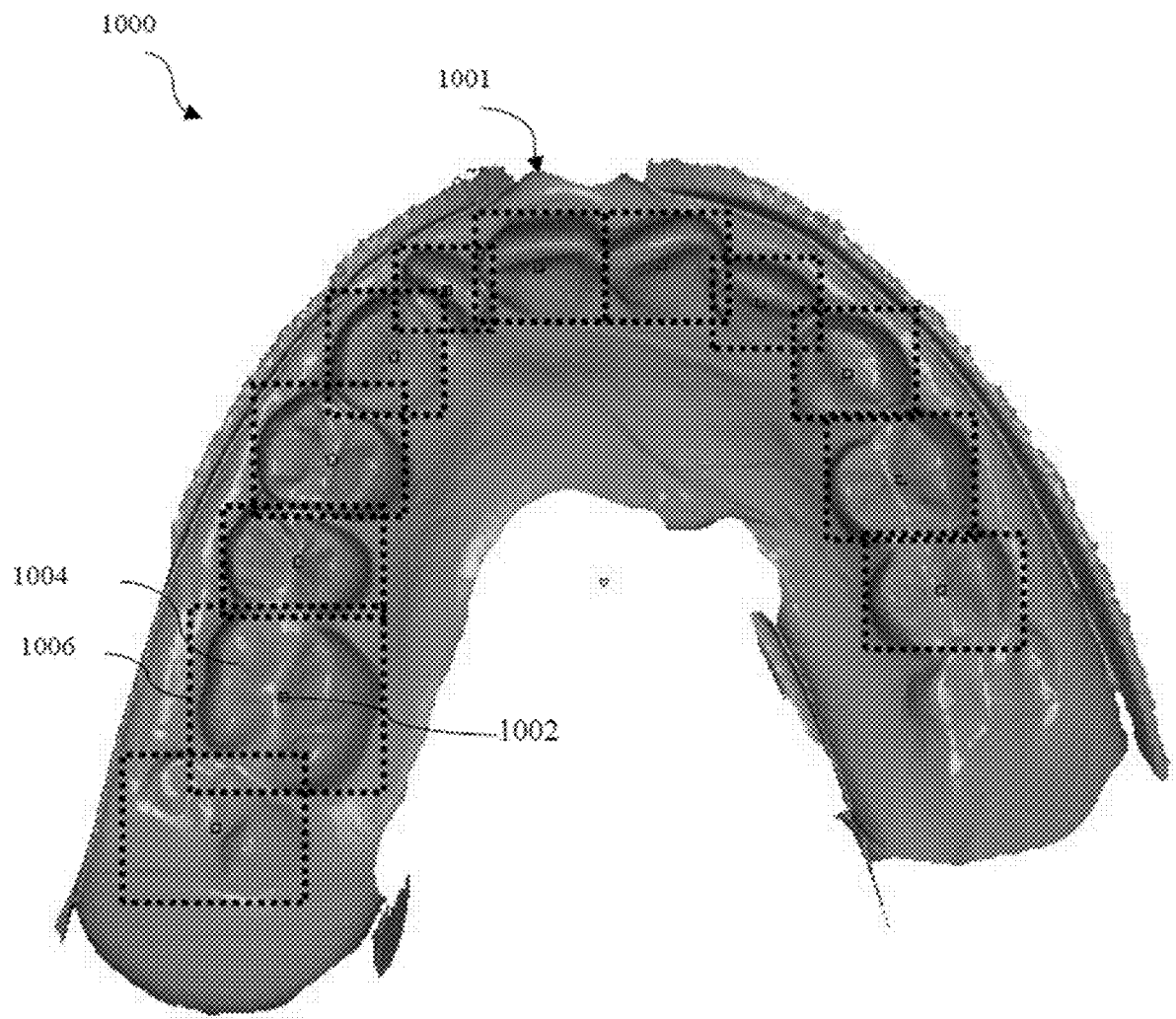
FIG. 10 shows a perspective view of an example of a 3D digital model of a portion of a digital jaw with one or more bounding regions in some embodiments.

In some embodiments, the computer-implemented method can determine a digital tooth center for each digital tooth from the bounding boxes. In some embodiments, the computer-implemented method can determine a bounding box center as the digital tooth center. FIG. 10 illustrates an example of a digital model 1000 that can include digital jaw 1001 having one or more digital teeth, each digital tooth having a bounding box defining a region comprising the digital tooth. As illustrated a digital tooth center 1002 determined for a digital tooth 1004 as the bounding box 1006 center. The computer-implemented method can determine a digital tooth center for each digital tooth in the digital model 1000 based on the digital tooth's bounding box in some embodiments, for example.

Figure 11:
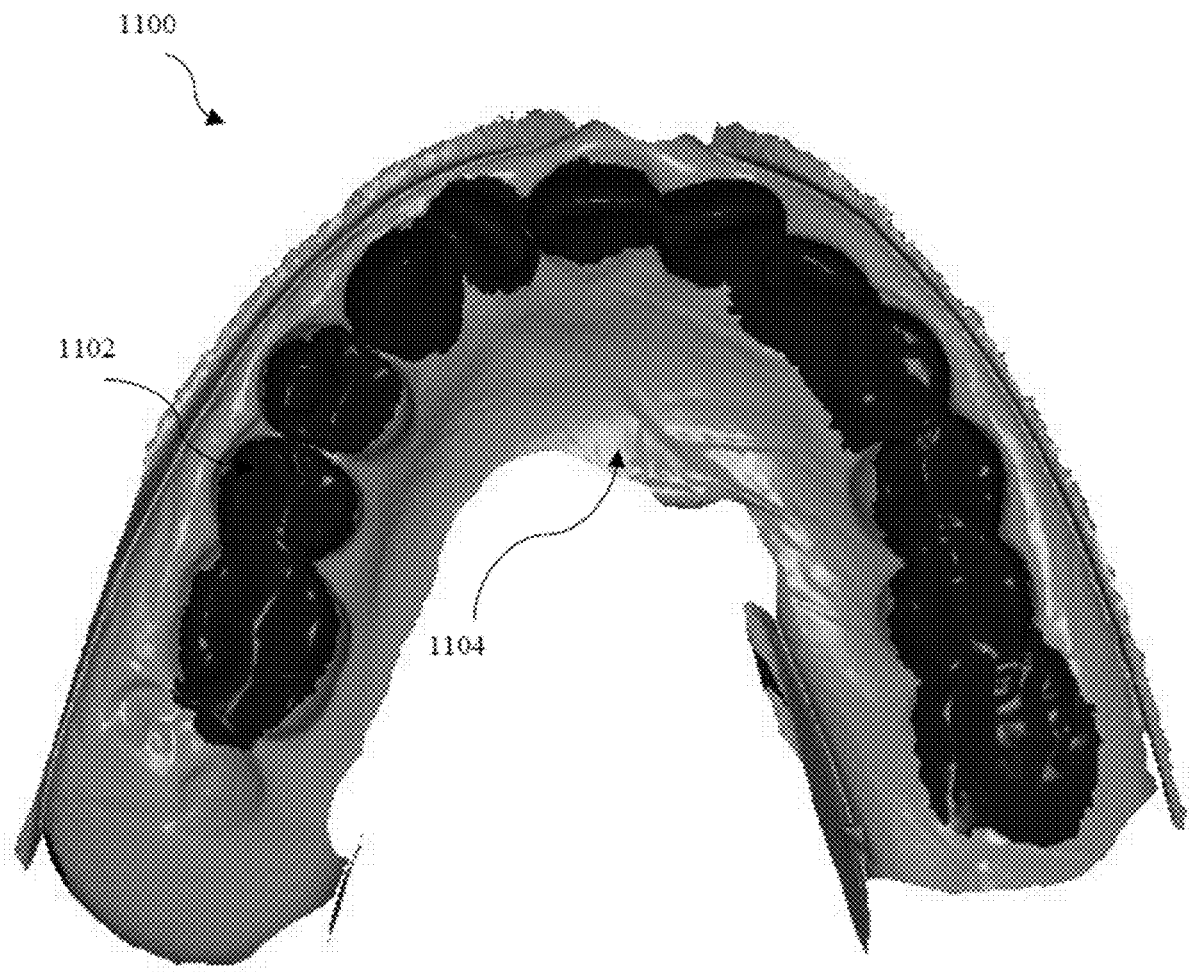
FIG. 11 shows a perspective view of an example of a 3D digital model of a portion of a digital jaw showing one or more digital tooth regions in some embodiments.

Some embodiments of the computer-implemented method can include determining a digital tooth area around the digital tooth center. In some embodiments, determining the digital tooth area can include constructing a proximate region comprising one or more points within a center region distance from the digital tooth center along the digital surface. In some embodiments, the center region distance is a digital surface distance that includes a tooth corresponding to the digital tooth center. In some embodiments, the computer-implemented method can determine a digital tooth associated with each digital tooth center based on a user-configurable center region distance from the digital tooth center. In some embodiments, the center region distance can be 3 mm, for example. However, other suitable values for the center region distance can also be used to determine the digital tooth corresponding to a particular digital tooth center. For example, FIG. 11 illustrates a digital model 1100 that can include one or more digital tooth regions within the center region distance such as first digital tooth region 1102 as well as non-teeth regions such as first digital non-tooth region 1104.

Some embodiments can include deleting one or more surface segments not intersecting with the digital tooth area. Some embodiments can include deleting all merged segments located greater than the center region distance from the digital tooth center.

Figure 12:
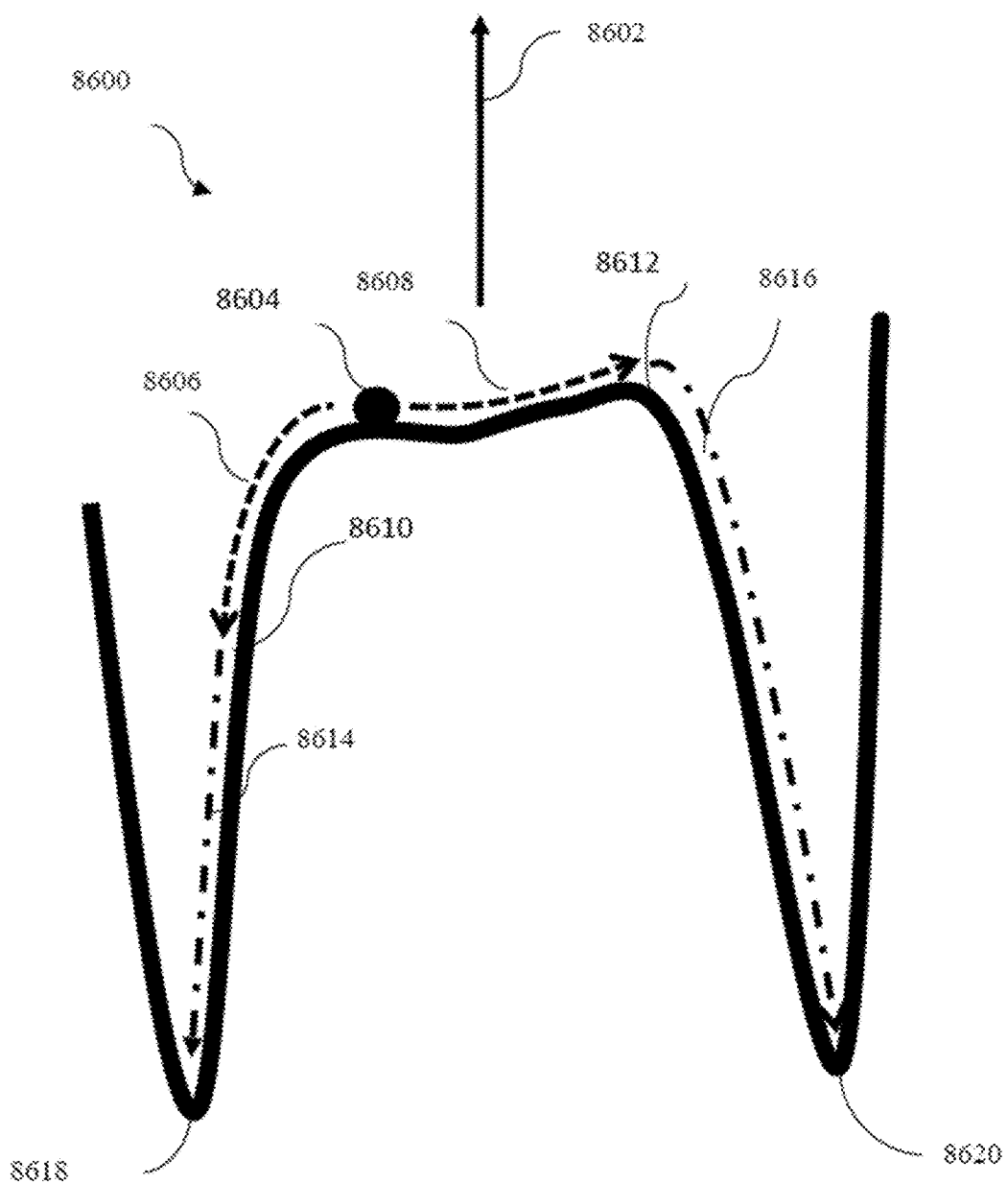
FIG. 12 shows a cross section view of a digital surface impression.

FIG. 12 illustrates an example of one embodiment of removing extraneous digital surface regions. FIG. 12 shows a cross section view of a digital surface impression with digital tooth 8600 having an occlusion direction 8602 and an initial digital tooth center 8604. In some embodiments, the initial digital tooth center can be one or more digital surface points.

The computer-implemented method determines a first proximate region by generating first region paths 8606 and 8608 from the initial digital tooth center 8604 and extending along the digital surface until reaching the first region endpoints 8610 and 8612, respectively. In this example, the first region endpoints 8610 and 8612 are located at a cutoff value of a cutoff distance from the initial digital tooth center 8604. In some embodiments, this can be, for example, 3 mm. Other suitable values can be used as well.

The computer-implemented method determines a second proximate region by generating second region paths 8614 and 8616 from the first region endpoints 8610 and 8612 and extending along the digital surface until reaching the second region endpoints 8618 and 8620, respectively. In this example, the second region endpoints 8618 and 8620 are located at a cutoff value corresponding to lowest points on the digital surface with respect to the occlusion axis. The computer-implemented method can delete all regions outside of the tooth and gum region from the digital dental impression by, for example, retaining only the first and second digital surface proximate region which in some embodiments include only teeth and gum regions. The computer-implemented method in some embodiments thereby deletes or removes extraneous regions, retaining the teeth and gums.

Figure 13A:
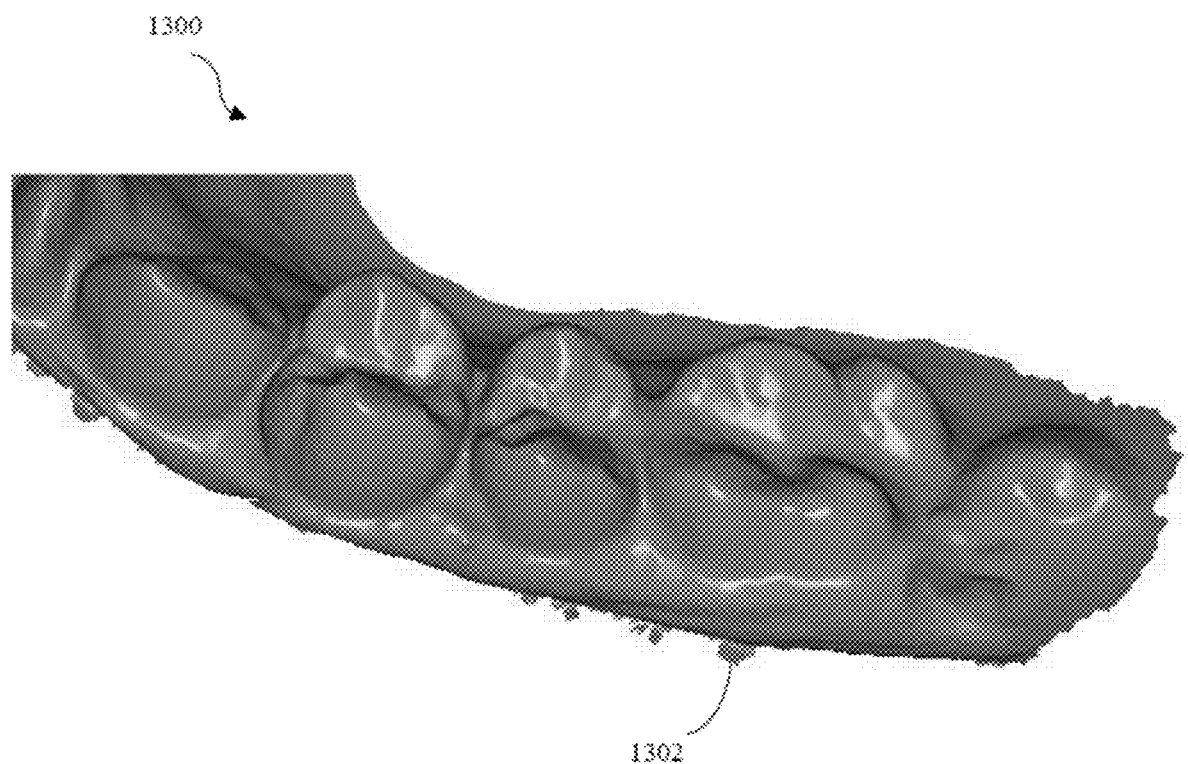
FIG. 13(a) shows a perspective view of an example of a 3D digital model of a portion of a digital jaw with one or more uneven boundary regions in some embodiments.
Figure 13B:
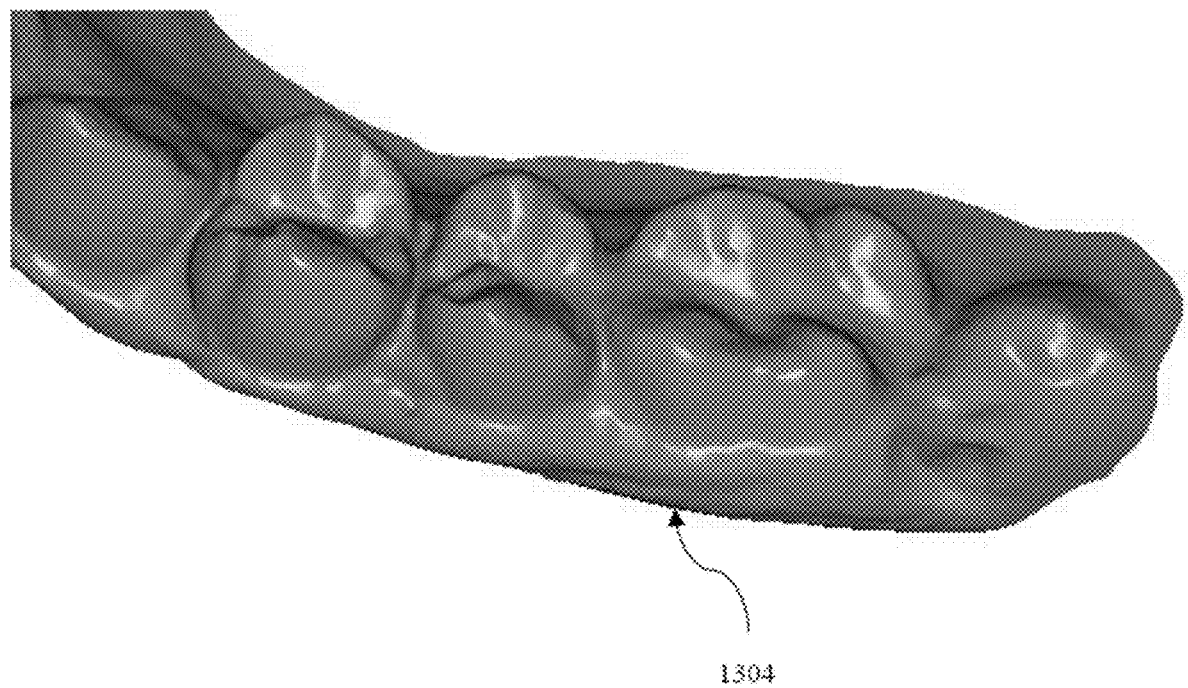
FIG. 13(b) shows a perspective view of an example of a 3D digital model of a portion of a digital jaw with one or more smoothed boundary regions in some embodiments.

In some cases, after segmentation, the digital jaw can include a digital boundary region that can be uneven and rough in appearance. FIG. 13(*a*) illustrates an example of a portion of a digital jaw 1300 having an uneven boundary region 1302. Some embodiments of the computer-implemented method can include smoothing a mesh boundary to produce a smoothed mesh boundary such as smooth boundary 1304 as illustrated in FIG. 13(*b*).

In some embodiments, smoothing can include performing morphological opening on at least a portion of the segmented digital jaw model. In some embodiments, morphological opening can include performing erosion and dilation at a boundary region. For example, in some embodiments, the computer-implemented method can virtually erode the triangles near the boundary to a user configurable erosion distance and then virtually dilate them back a user configurable dilation distance. In some embodiments, the erosion distance and the dilation distance can be the same. In some embodiments, the erosion distance and the dilation distance can be, for example, 3 mm. Other suitable erosion distances and dilation distances can be used. In some embodiments, the computer-implemented method can delete the triangles not reached by the dilation.

In some embodiments, the computer-implemented method can perform erosion starting at one or more mesh boundary vertices. In some embodiments, erosion can include probing the boundary region using a pre-defined shape as a structuring element. In some embodiments, the computer-implemented method can virtually construct the structuring element as a union of all disks around boundary vertices and subtract the union of all disks from the surface region. In some embodiments, a surface disk can be a user-configurable radius around a central point, containing all other points with distance along the surface within the radius. In some embodiments, the radius can be, for example, 3 mm. Other suitable radius values are also contemplated and can be used. In some embodiments, the computer-implemented method can perform erosion on a boundary region, A, using a structuring element, B as follows:

$$A \ominus B = \{z \in E | B_z \subseteq A\}$$

where $B_z$ is a translation of B by vector z. In some embodiments, erosion of boundary region A by structured element B can be points reached by the center of B as B moves within A. Other techniques to perform erosion can also be used.

In some embodiments, the computer-implemented method can perform dilation by constructing the union of all disks around boundary vertices after subtraction and add the union to the boundary surface region. In some embodiments, the computer-implemented method can perform dilation as follows:

$$A \oplus B \cup_{b \in B} A_b$$

where A is the boundary region and B is the structured element. In some embodiments, B has a center as its origin, so that dilation of A by B is all points covered by B when the center of B moves within A. Other techniques to perform dilation can also be used.

In some embodiments, the computer-implemented method can virtually construct a union of all disks using Dijkstra's shortest path searching algorithm with multiple start vertices. In some embodiments, the multiple start vertices can be one or more boundary vertices, for example.

In some embodiments, the computer-implemented method can perform Dijkstra's algorithm as follows:

1. Set one or more initial digital surface points. In some embodiments, the one or more initial digital surface points can be boundary vertices.

2. Mark all digital surface points as unvisited.

3. Assign every digital surface point—a tentative distance value. The tentative distance value for the initial digital surface point is assigned to zero and the tentative distance value for all other digital surface points on the one side is assigned to infinity or the highest possible value or larger than the sum of all edge lengths, for example. Set one of initial digital surface points as the current digital surface point.

4. For the current digital surface point, consider all unvisited neighboring digital surface points on the one side and determine their calculated tentative distances (e.g. edge length between the current digital surface point and the particular unvisited neighboring digital surface point) through the current digital surface point. In some embodiments, the calculated tentative distance can determine an edge length between current digital surface point and the particular unvisited neighboring digital surface point. In some embodiments, edge length is a Euclidean length.

5. Compare the newly calculated tentative distance to the current assigned value and assign the smaller one. For example, if the current digital surface point A is marked with a distance of 6, and the edge connecting it with a neighboring digital surface point B has length 2, then the distance to B through A will be 6+2=8. If B was previously marked with a distance greater than 8 then change it to 8. Otherwise, keep the current value.

6. After considering all of the unvisited neighbors of the current digital surface point, mark the current digital surface point as visited and remove it from the unvisited set. A visited digital surface point will never be checked again.

7. If the destination digital surface point has been marked visited (when planning a route between two specific digital surface points) or if the smallest tentative distance among the digital surface points in the unvisited set is infinity, or the highest possible value, or larger than the sum of all edge lengths for example (when planning a complete traversal; occurs when there is no connection between the initial digital surface point and remaining unvisited digital surface points), then stop. The algorithm has finished. In some embodiments, the algorithm also stops when the smallest tentative distance becomes larger than a user-configurable max distance. In some embodiments, the max distance can be, for example, 3 mm. Other suitable max distance values are contemplated and can be used.

Otherwise, select the unvisited digital surface point that is marked with the smallest tentative distance, set it as the new "current digital surface point", and go back to step 4.

Figure 14A:
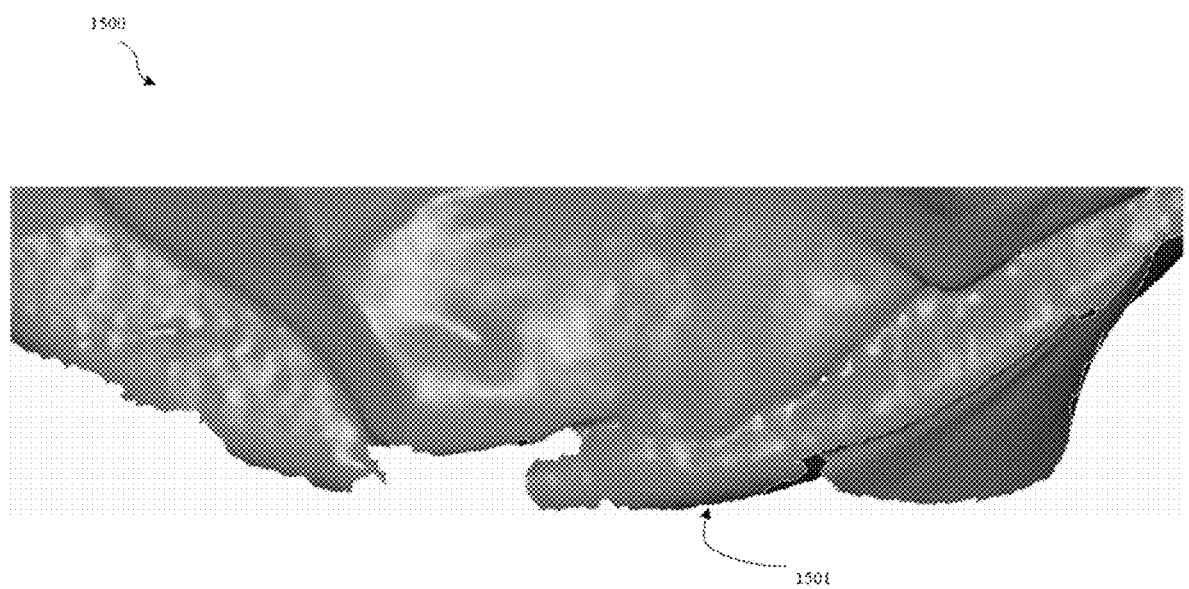
FIG. 14(a) shows a perspective view of an example of a 3D digital model of a portion of a digital jaw with one or more uneven boundary regions in some embodiments.
Figure 14B:
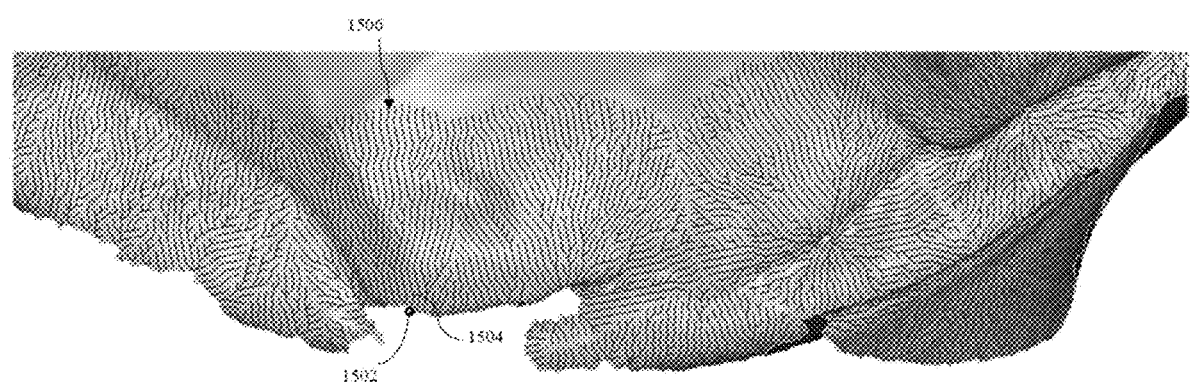
FIG. 14(b) shows a perspective view of an example of a 3D digital model of a portion of a digital jaw after erosion.

FIG. 14(a) illustrates an example of at least a portion of a digital model 1500 that includes an uneven boundary region 1501 prior to performing boundary smoothing using Dijkstra's algorithm, for example. FIG. 14(b) illustrates an example of the computer-implemented method performing erosion by selecting one or more boundary vertices such as boundary vertex 1502 and determining all erosion paths from the boundary vertex, where the erosion path length is less than a max distance. For example, the max distance can be 3 mm. Other suitable max distance values are contemplated, and can be used in some embodiments. The computer-implemented method can determine erosion paths for each boundary vertex in some embodiments. The result of erosion can be a forest of edges, such as edge 1504, with the forest having an erosion boundary region such as erosion boundary region 1506, for example. Each erosion path has the length at most 3 mm in the example.

Figure 14C:
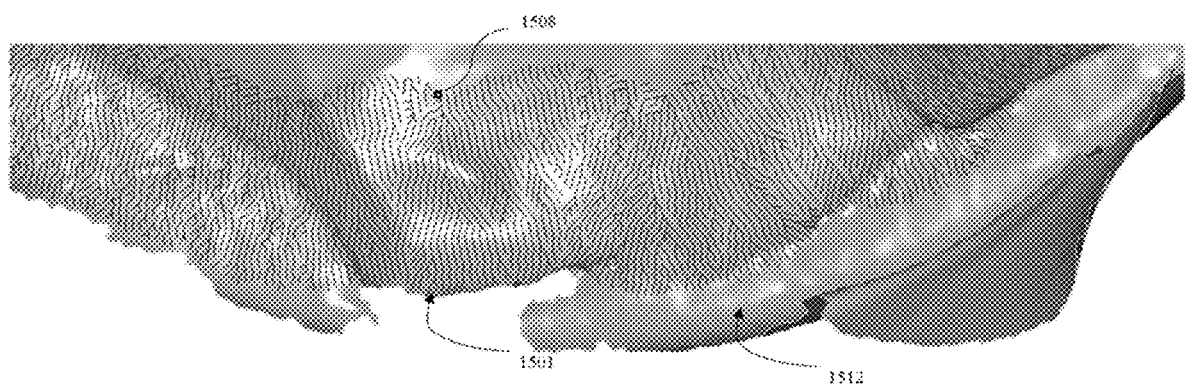
FIG. 14(c) shows a perspective view of an example of a 3D digital model of a portion of a digital jaw after dilation.
Figure 14D:
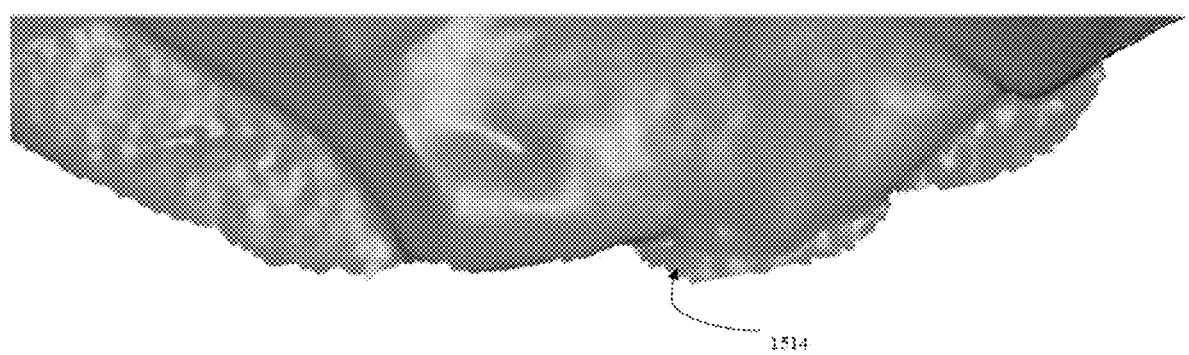
FIG. 14(d) shows a perspective view of an example of a 3D digital model of a portion of a digital jaw after boundary smoothing.

FIG. 14(c) illustrates an example of the computer-implemented method performing dilation by selecting one or more erosion boundary region vertices 1508 and determining a dilation path from the erosion boundary region vertex toward the boundary region 1501, where the dilation path length is less than a max distance. For example, the max distance can be 3 mm. Other suitable max distance values are contemplated, and can be used in some embodiments. The computer-implemented method can delete all boundary regions not reached by the dilation such as unreached boundary region 1512 in some embodiments, thereby producing a smoothed boundary such as smoothed boundary region 1514 as illustrated shown in FIG. 14(d), for example.

Figure 15:
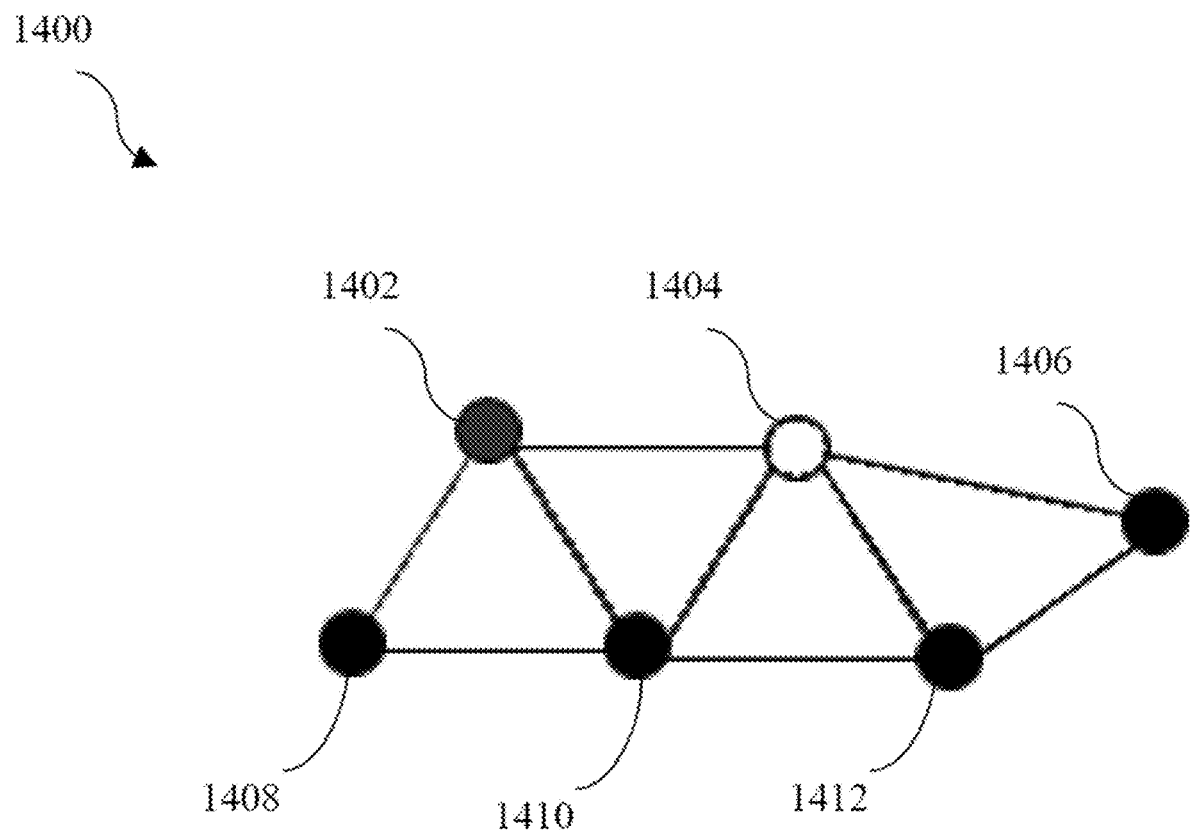
FIG. 15 shows a 2D illustration example of a 3D boundary region with boundary vertices.

In some embodiments, smoothing the mesh boundary can include performing Laplacian smoothing on the segmented digital jaw model. In some embodiments, the computer-implemented method can perform Laplacian smoothing by moving each of one or more boundary vertices to the middle between its two respective neighboring vertices. In some embodiments, Laplacian smoothing can be performed by the computer-implemented method as follows:

$$\overline{x}_i = \frac{1}{N}\sum_{j=1}^{N} \overline{x}_j$$

where N represents the number of vertices adjacent to node i, $\overline{x}_j$ represents the position of the j-th adjacent vertex, and $\overline{x}_i$ represents the new position for node i. In some embodiments, N is 2 for boundary smoothing. The computer-implemented method can in some embodiments perform Laplacian smoothing for every boundary vertex. FIG. 15 illustrates an example of Laplacian smoothing on a portion of a digital surface 1400. The portion of the digital surface 1400 can include one or more boundary vertices such as first digital boundary vertex 1402, second digital boundary vertex 1404, and third digital boundary vertex 1406 as well as first digital non-boundary vertex 1408, second digital non-boundary vertex 1410, and third digital non-boundary vertex 1412. In some embodiments the computer-implemented method can perform Laplacian smoothing in the example by moving the second digital boundary vertex 1404 to a middle position between the first digital boundary vertex 1402 and the third digital boundary vertex 1406. In some embodiments, this middle position can be in three dimensions. The same process can be repeated for the first digital boundary vertex 1402 with respect to its boundary neighbors and for the third digital boundary vertex 1406 with respect to its boundary neighbors. Non-boundary vertices such as first digital first digital non-boundary vertex 1408, second digital non-boundary vertex 1410, and third digital non-boundary vertex 1412 can be excluded from Laplacian smoothing in some embodiments.

Laplacian smoothing of one or more boundary vertices can continue for a user-configurable number of iterations. In some embodiments, the number of Laplacian smoothing iterations can be 5, for example. Other suitable number of Laplacian smoothing iterations can also be used in some embodiments. In an alternative embodiment, the computer-implemented method can determine a shift of each mesh vertex during smoothing and stop iterations if no vertex has moved more than a user-configurable threshold iteration distance. For example, in some embodiments, the threshold iteration distance can be 0.01 mm. Other suitable threshold iteration distance values can be used.

In some embodiments, the computer-implemented method can train one or more neural networks. In some embodiments, the computer-implemented method can implement one or more neural networks. In some embodiments, the computer-implemented method can implement one or more features in the present disclosure.

Figure 16A:
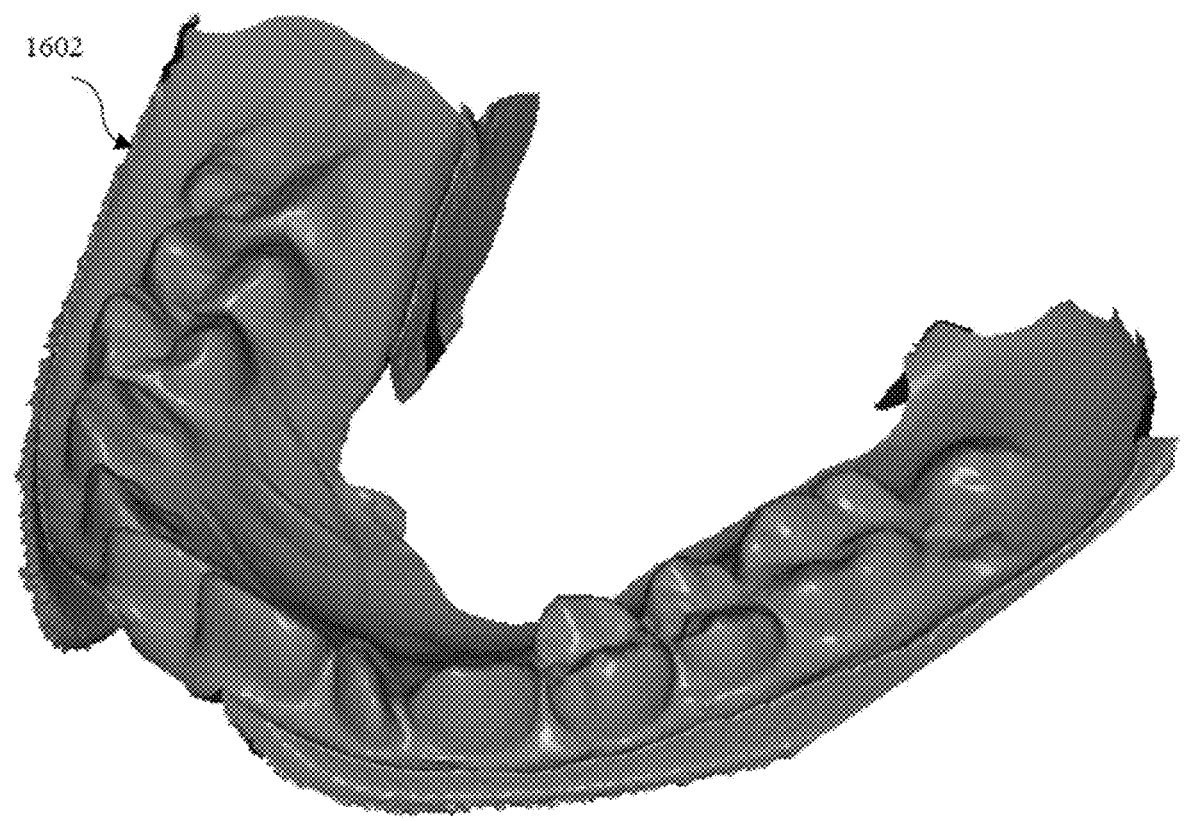
FIG. 16(a) shows a perspective view of an example of a 3D digital model of a digital jaw before processing in some embodiments.
Figure 16B:
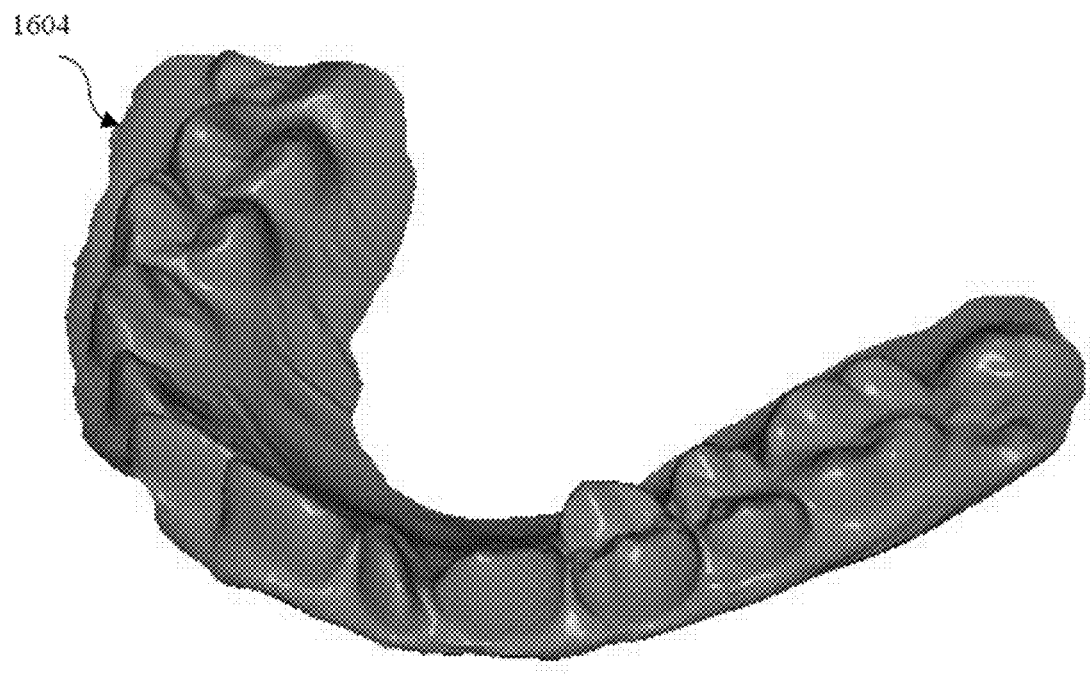
FIG. 16(b) shows a perspective view of an example of a 3D digital model of a digital jaw after processing in some embodiments.
Figure 16C:
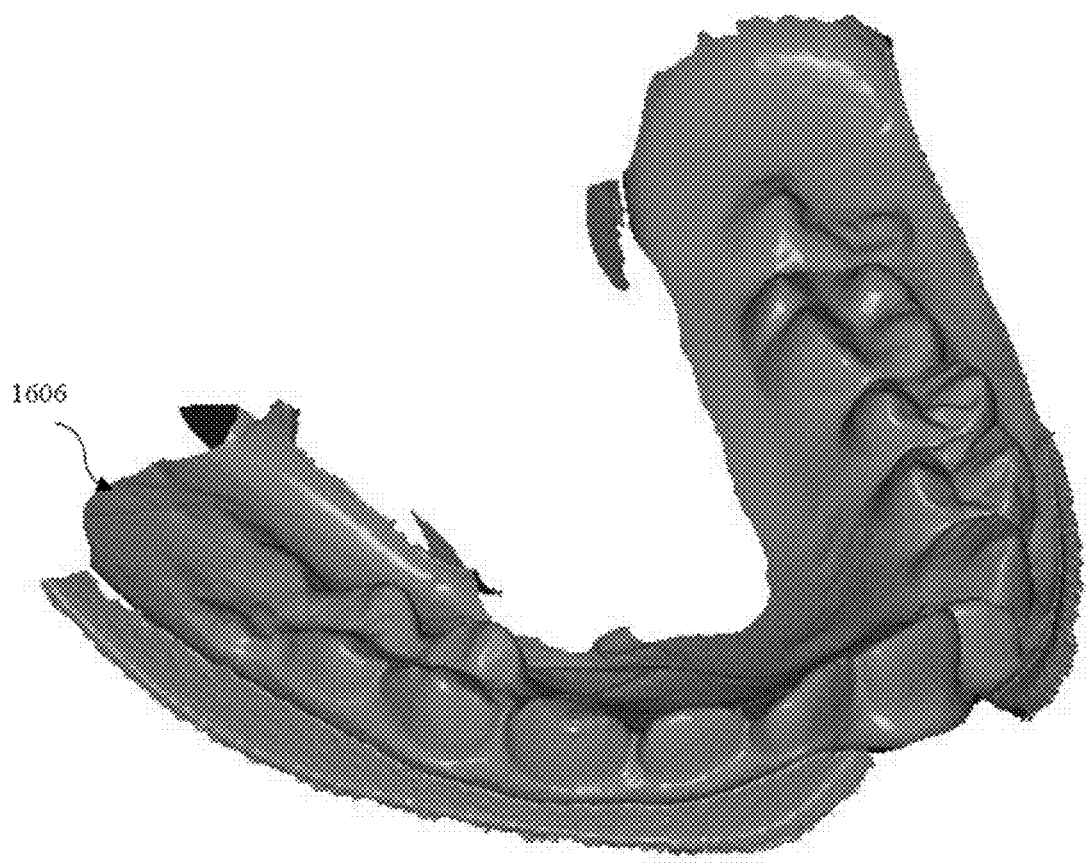
FIG. 16(c) shows a perspective view of an example of a 3D digital model of a digital jaw before processing in some embodiments.
Figure 16D:
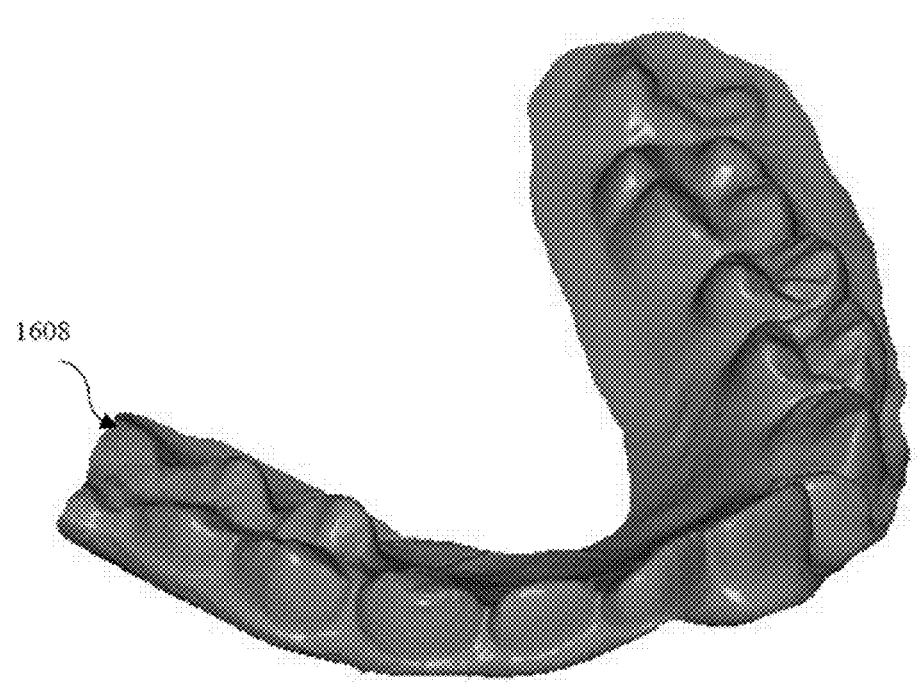
FIG. 16(d) shows a perspective view of an example of a 3D digital model of a digital jaw after processing in some embodiments.

FIG. 16(a) illustrates an example input digital jaw 1602 that can be processed by the computer-implemented method using one or more features in the present disclosure to provide a processed digital jaw 1604 shown in FIG. 16(b) in some embodiments. FIG. 16(c) illustrates another example of an input digital jaw 1606 that can be processed by the computer-implemented method using one or more features in the present disclosure to provide a processed digital jaw 1608 shown in FIG. 16(d) in some embodiments.

Figure 17:
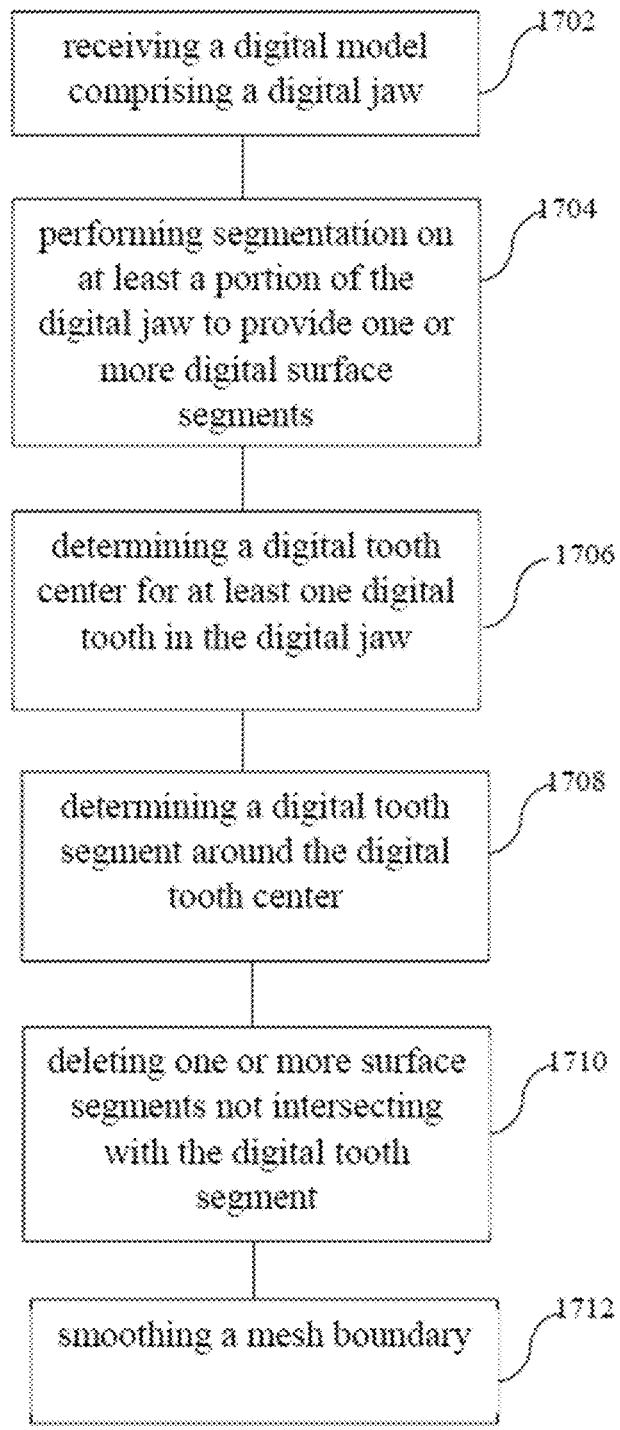
FIG. 17 shows a flow chart of an example of a computer-implemented method in some embodiments.

FIG. 17 illustrates an example in some embodiments of a computer-implemented method of processing a digital jaw scan. The computer-implemented method can include receiving a digital model comprising a digital jaw at 1702, performing segmentation on at least a portion of the digital jaw to provide one or more digital surface segments at 1704, determining a digital tooth center for at least one digital tooth in the digital jaw at 1706, determining a digital tooth area around the digital tooth center at 1708, deleting one or more surface segments not intersecting with the digital tooth area at 1710, and smoothing a mesh boundary at 1712. In some embodiments, the digital model can be received by the computer-implemented method by loading the digital model from one or more storage devices and/or received from an external computing device over a computer network, for example.

The computer-implemented method can include one or more other features in various combinations. In some embodiments, segmentation can include curvature-based segmentation. In some embodiments, performing segmentation can include determining one or more geometric properties of boundaries between the one or more digital surface segments. In some embodiments, the geometric boundary can include a convex boundary. In some embodiments, further comprising merging one or more initial digital surface segments into one or more merged digital surface segments based on a merge metric. In some embodiments, the merge metric is based on a perimeter of the after-merged segment and an average mean curvature on a boundary between the pair of adjacent initial digital surface segments. In some embodiments, determining the digital tooth center can include determining a bounding region for one or more digital teeth in the digital jaw. In some embodiments, the digital tooth center is determined by using a trained neural network.

Some embodiments include a processing system for processing a digital jaw scan that can include a processor, a computer-readable storage medium including instructions executable by the processor to perform steps including: receiving a digital model comprising a digital jaw; performing segmentation on at least a portion of the digital jaw to provide one or more digital surface segments; determining a digital tooth center for at least one digital tooth in the digital jaw; determining a digital tooth area around the digital tooth center; deleting one or more surface segments not intersecting with the digital tooth area; and smoothing a mesh boundary.

Figure 18:
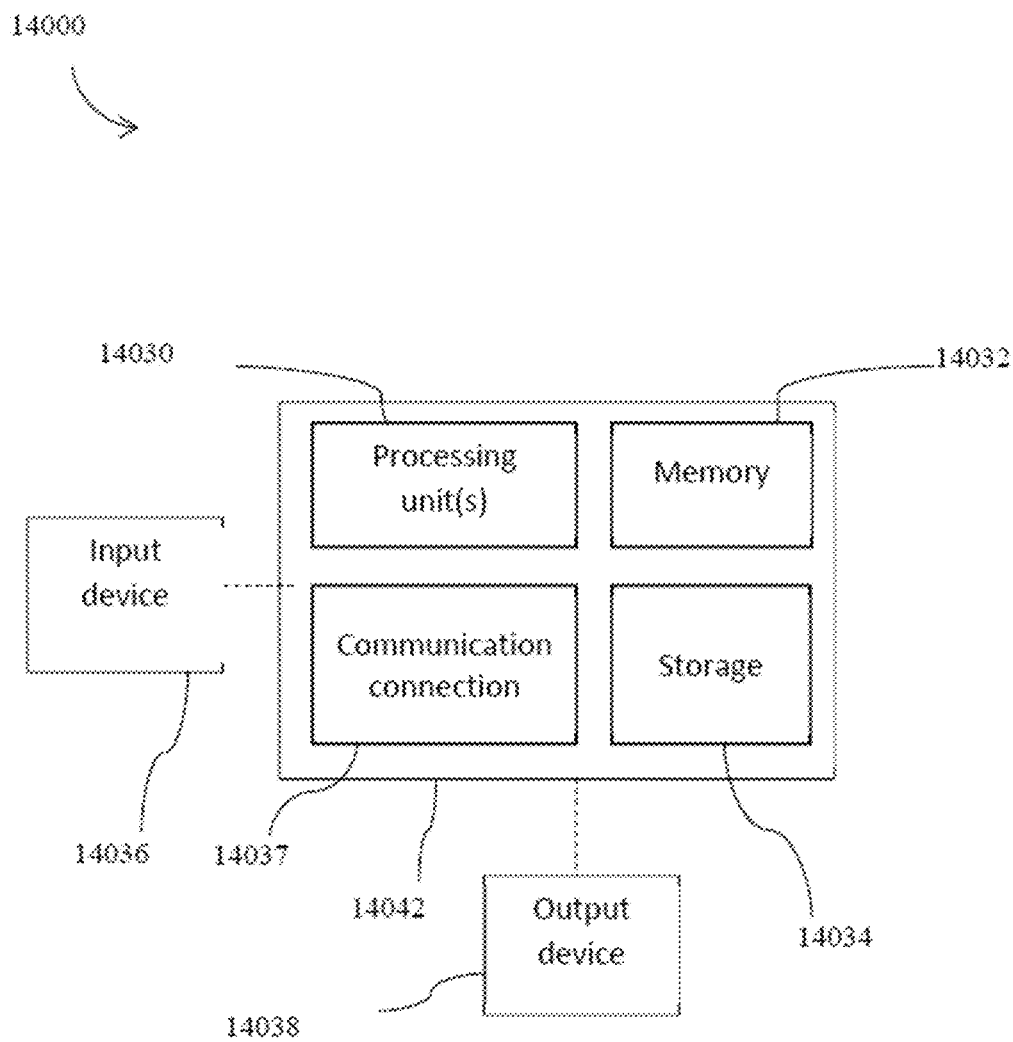
FIG. 18 shows a system diagram of a system in some embodiments.

FIG. 18 illustrates a processing system 14000 in some embodiments. The system 14000 can include a processor 14030, computer-readable storage medium 14034 having instructions executable by the processor to perform one or more steps described in the present disclosure. In some embodiments, the processing system 14000 can process a digital model using one or more features disclosed herein and output a processed digital model, for example.

One or more advantages of one or more features in the present disclosure can include, for example, automatic clean-up of jaw scans without requiring a user to manually select regions or perform manual steps. One or more advantages of one or more features can include, for example, a more accurate digital dental model reflecting a patient's dentition. One or more advantages of one or more features can include, for example, improved speed in cleaning up a digital surface of a digital model compared to, for example, manual processing performed by a user. One or more advantages of one or more features can include, for example, not requiring precise tooth segmentation, thereby decreasing processing time and using less processing resources. One or more advantages of one or more features can include, for example, removing at least a portion of non-relevant information from a digital jaw model.

In some embodiments, processing a digital jaw scan as disclosed in the present disclosure can be initiated by a user, for example. In some embodiments, processing a digital jaw scan can include one or more of the features described in the present disclosure. In some embodiments, processing a digital jaw scan can be performed by a user using an input device while viewing the digital model on a display, for example. In some embodiments, the computer-implemented method can allow the input device to manipulate the digital model displayed on the display. For example, in some embodiments, the computer-implemented method can rotate, zoom, move, and/or otherwise manipulate the digital model in any way as is known in the art. In some embodiments, processing a digital jaw scan can be performed by a user using the input device. In some embodiments, processing a digital jaw scan can be initiated, for example, using techniques known in the art, such as a user selecting another graphical user interface element such as a graphical button.

One or more of the features disclosed herein can be performed and/or attained automatically, without manual or user intervention. One or more of the features disclosed herein can be performed by a computer-implemented method. The features—including but not limited to any methods and systems—disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

For example, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity.

The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

What is claimed is:

1. A computer-implemented method of processing a digital jaw scan, comprising:
   receiving a digital model comprising a digital jaw;
   performing segmentation on at least a portion of the digital jaw to provide one or more digital surface segments comprising a digital surface mesh;
   determining a digital tooth center for at least one digital tooth in the digital jaw;
   determining a digital tooth area around the digital tooth center;
   deleting one or more surface segments not intersecting with the digital tooth area; and
   smoothing a digital surface mesh boundary,
   wherein smoothing the digital surface mesh boundary comprises performing erosion and dilation at a boundary region, and deleting one or more boundary regions not reached by the dilation.

2. The method of claim 1, wherein the segmentation comprises curvature based segmentation.

3. The method of claim 1, wherein performing segmentation comprises determining one or more geometric properties of boundaries between the one or more digital surface segments.

4. The method of claim 3, wherein the one or more geometric properties a comprises a convex boundary.

5. The method of claim 1, further comprising merging one or more initial digital surface segments into one or more merged digital surface segments based on a merge metric.

6. The method of claim 5, wherein the merge metric is based on a perimeter of an after-merged segment and an average mean curvature on a boundary between a pair of adjacent initial digital surface segments.

7. The method of claim 1, wherein determining the digital tooth center comprises determining a bounding region for one or more digital teeth in the digital jaw.

8. The method of claim 7, wherein the digital tooth center is determined by using a trained neural network.

9. A system of processing a digital jaw scan, comprising:
   a processor; and
   a computer-readable storage medium comprising instructions executable by the processor to perform steps comprising:
   receiving a digital model comprising a digital jaw;
   performing segmentation on at least a portion of the digital jaw to provide one or more digital surface segments comprising a digital surface mesh;
   determining a digital tooth center for at least one digital tooth in the digital jaw;
   determining a digital tooth area around the digital tooth center;
   deleting one or more surface segments not intersecting with the digital tooth area; and
   smoothing a digital surface mesh boundary,
   wherein smoothing the digital surface mesh boundary comprises performing erosion and dilation, and deleting one or more boundary regions not reached by the dilation.

10. The system of claim 9, wherein the segmentation comprises curvature-based segmentation.

11. The system of claim 9, wherein the digital surface segments are separated by a geometric boundary.

12. The system of claim 11, wherein the geometric boundary comprises a convex boundary.

13. The system of claim 9, further comprising merging one or more initial digital surface segments into one or more merged digital surface segments based on a merge metric.

14. The system of claim 13, wherein the merge metric is based on a perimeter of an after-merged segment and an average mean curvature on a boundary between a pair of adjacent initial digital surface segments.

15. The system of claim 9, wherein determining the digital tooth center comprises determining a bounding region for one or more digital teeth in the digital jaw.

16. The system of claim 15, wherein the digital tooth center is determined by using a trained neural network.

17. A non-transitory computer readable medium storing executable computer program instructions for processing a digital jaw scan, the computer program instructions comprising instructions that when executed by a computer, cause the computer to perform:

performing segmentation on at least a portion of the digital jaw to provide one or more digital surface segments comprising a digital surface mesh;

determining a digital tooth center for at least one digital tooth in the digital jaw;

determining a digital tooth area around the digital tooth center;

deleting one or more surface segments not intersecting with the digital tooth area; and smoothing a digital surface mesh boundary, wherein smoothing the digital surface mesh boundary comprises performing erosion and dilation, and deleting one or more boundary regions not reached by the dilation.

18. The medium of claim 17, wherein the segmentation comprises curvature-based segmentation.

19. The medium of claim 17, wherein determining the digital tooth center comprises determining a bounding region for one or more digital teeth in the digital jaw.

20. The medium of claim 19, wherein the digital tooth center is determined by using a trained neural network.

* * * * *